US011403687B2

United States Patent
Hashimoto et al.

(10) Patent No.: US 11,403,687 B2
(45) Date of Patent: Aug. 2, 2022

(54) SYSTEM AND METHOD OF TRADING A ROBOT

(71) Applicant: KAWASAKI JUKOGYO KABUSHIKI KAISHA, Kobe (JP)

(72) Inventors: Yasuhiko Hashimoto, Kobe (JP); Koji Muneto, Kobe (JP); Atsushi Kameyama, Kakogawa (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 99 days.

(21) Appl. No.: 16/480,479

(22) PCT Filed: Aug. 31, 2017

(86) PCT No.: PCT/JP2017/031450
§ 371 (c)(1),
(2) Date: Jul. 24, 2019

(87) PCT Pub. No.: WO2018/138952
PCT Pub. Date: Aug. 2, 2018

(65) Prior Publication Data
US 2020/0005377 A1 Jan. 2, 2020

(30) Foreign Application Priority Data
Jan. 24, 2017 (JP) .............................. JP2017-010374

(51) Int. Cl.
*G06Q 30/06* (2012.01)
(52) U.S. Cl.
CPC ..... *G06Q 30/0621* (2013.01); *G06Q 30/0625* (2013.01); *G06Q 30/0633* (2013.01); *G06Q 30/0643* (2013.01)

(58) Field of Classification Search
CPC ........... G06Q 30/0621; G06Q 30/0625; G06Q 30/0633; G06Q 30/0643; G06Q 30/0601–0645
(Continued)

(56) References Cited

U.S. PATENT DOCUMENTS 6,431,018 B1    8/2002  Okada et al.
9,333,435 B1 *  5/2016  Kim ......................... A63H 3/16
(Continued)

FOREIGN PATENT DOCUMENTS

CN          1363072 A      8/2002
JP       2001-014021 A     1/2001
(Continued)

OTHER PUBLICATIONS

Build your own custom robot at my robot nation, design boom, Dec. 1, 2011 (Year: 2011).*
(Continued)

*Primary Examiner* — Marissa Thein
*Assistant Examiner* — Anna Mae Mitros
(74) *Attorney, Agent, or Firm* — Oliff PLC

(57) ABSTRACT

The method includes urging a customer a selection of a base robot that becomes a base of the robot by communicating electronic data, receiving the selection of the base robot, extracting variable specification items of the selected base robot based on information related to variable specifications among a given basic specification of the base robot from a variable specification database, determining a special order specification in which at least one of the variable specification items is changed from the basic specification, searching the information related to component parts of the base robot and parts attachable to the base robot for parts that constitute the robot so that the special order specification is realized, presenting to the customer a virtual object of the robot where (Continued)

the searched parts are mounted to the base robot, urging the customer an input of an order for the robot, and receiving the order for the robot and accepting the order for the robot.

8 Claims, 15 Drawing Sheets

(58) Field of Classification Search
USPC ........................................ 705/26.5, 26.1–27.2
See application file for complete search history.

(56) References Cited

U.S. PATENT DOCUMENTS

| | | | |
|---|---|---|---|
| 10,414,046 B1* | 9/2019 | Morey | B25J 9/1617 |
| 2002/0138359 A1 | 9/2002 | Noma | |
| 2003/0158629 A1 | 8/2003 | Matsuoka et al. | |
| 2007/0135933 A1* | 6/2007 | Panesse | B25J 9/1671 700/17 |
| 2015/0324502 A1* | 11/2015 | Eberhardt | G06F 30/18 703/6 |
| 2016/0257002 A1* | 9/2016 | Takayama | B21D 5/006 |
| 2017/0285628 A1* | 10/2017 | Erhart | B25J 13/006 |

FOREIGN PATENT DOCUMENTS

| | | |
|---|---|---|
| JP | 2001-150382 A | 6/2001 |
| JP | 2001-250045 A | 9/2001 |
| JP | 2002-254371 A | 9/2002 |
| JP | 2003-203171 A | 7/2003 |
| JP | 2013-196015 A | 9/2013 |

OTHER PUBLICATIONS

Kodaira, Norio, "Imasara Kikenai Sangyoyo Robot Nyumon [Zenpen]," Mar. 10, 2014, [http://monoist.atmarkit.co.jp/mn/articles/1403/10/news006_2.html].

"Tokushu Tsukutte Manaberu! Kosaku Kit no Tanoshimikata", Robokon Magazine, The January issue, Ohmsya, Ltd., Jan. 1, 2010, pp. 8-11.

* cited by examiner

SYSTEM AND METHOD OF TRADING A ROBOT

TECHNICAL FIELD

The present disclosure relates to a trading system of a robot and a method of trading a robot, which performs a business transaction of robots.

BACKGROUND ART

Conventionally, the business transaction of a customized robot in which a customer decides the specification is proceeded as follows. (i) The customer decides a requirement specification, (ii) a robot manufacturer determines a base robot which becomes a base of the customized robot and parts to be attached to the base robot based on the requirement specification, (iii) the robot manufacturer proposes to the customer the robot customized in this way, (iv) the customer accepts the proposal and places an order for the proposal, and (v) the robot manufacturer which received the order hands over the customized robot to the customer. Normally, the customized robot is handed over to the customer as an assembled finished product.

In recent years, technologies have been proposed in which customized robots as described above, and parts and programs therefor are handled as objects of the electronic commerce. For example, Patent Documents 1 and 2 disclose this kind of technology.

Patent Documents 1 discloses a merchandize order receiving system in which a robot pet is used as an item for sale, and the robot pets are transacted by means of electronic commerce. In this merchandize order receiving system, a virtual robot is displayed on a monitor of a user terminal, the learning function of the virtual robot is developed by operation of the user, and the manufacturer receives the developed study data, and the robot which stores the study data is sold to the user.

Moreover, Patent Documents 2 discloses an industrial robot and a method of selling software in which the robot includes a robotic arm, a control device which controls the robotic arm, and a teaching terminal unit which teaches the robotic arm, and the user is able to download a desired software function to the teaching terminal unit through the Internet.

REFERENCE DOCUMENT OF CONVENTIONAL ART

Patent Documents

[Patent Document 1] JP2003-203171A
[Patent Document 2] JP2002-254371A

DESCRIPTION OF THE DISCLOSURE

Problems to be Solved by the Disclosure

In the conventional business transaction of the robot, the technology of examining the conformity (matching) of the base robot with the parts etc. to be attached to the base robot corresponding to the customer's requirement specification is know-how of the robot manufacturer, which requires an advanced technology and an advanced understanding. Since complicated processings of a design, a compensation of operation, etc. are repeated in the conformity examination task, time and effort are required, and thereby the cost increases.

Moreover, especially in the customized robot, when providing the customer with the product, since tasks, such as an assembly, wiring, and piping, and a test operation, etc. which are different for every product are involved, the cost increases for the assembly and installation.

In the meantime, there is a customer's demand that he/she can freely try a customized robot which is customized to meet the requirement specification, and then obtain the robot at low price, if he/she is convinced. However, in the conventional business transaction of the robot, since various factors which lead to the cost increase are involved, such a request from the customer has not fully been satisfied.

The present disclosure is made in view of the above situations, and one purpose thereof is to enable a customer to freely try a customized robot which is customized to meet the customer's requirement specification, and obtain the robot at low price.

SUMMARY OF THE DISCLOSURE

A trading system of a robot according to one aspect of the present disclosure includes a variable specification database configured to store information on variable specifications among a given basic specification of a base robot that becomes a base of the robot, for every base robot, a special order specification determination part configured to receive a selection of the base robot from a customer terminal, extract variable specification items of the base robot selected from the variable specification database, and determine a special order specification in which at least one of the variable specification items is changed from the basic specification, a part database configured to store information on component parts of the base robot and parts attachable to the base robot, a conformity examination part configured to search the parts stored in the part database for a combination of the parts that constitute the robot so that the special order specification is realized, a customized robot presentation part configured to display on the customer terminal a virtual object of the robot where the searched parts are mounted to the base robot, and an ordering part configured to receive an order for the robot from the customer terminal and accept the order for the robot.

Further, a method of trading a robot according to another aspect of the present disclosure is a method of trading a robot performing a transaction of the robot by communicating electronic data through a network, and includes urging a customer a selection of a base robot that becomes a base of the robot, receiving the selection of the base robot, and extracting variable specification items of the selected base robot from an information group related to variable specifications among a given basic specification of the base robot, determining a special order specification in which at least one of the variable specification items is changed from the basic specification, searching the information group related to component parts of the base robot and parts attachable to the base robot for parts that constitute the robot so that the special order specification is realized, presenting to the customer a virtual object of the robot where the searched parts are mounted to the base robot, urging the customer an input of an order for the robot, and receiving the order for the robot and accepting the order for the robot.

Moreover, a trading system of a robot according to still another aspect of the present disclosure, in which a serially coupled body of a control unit, an arm part comprised of at least one movable unit, and an end effector unit is used as a base robot, includes a variable specification database configured to store information on variable specifications of the base robot that includes at least one variable specification item of the base robot, a movable unit database configured to store information on the movable unit, a part conformity examination result database configured to store information on a combination of the movable unit in which the variable specification is changed, a special order specification determination part configured to read the variable specification item corresponding to the base robot from the variable specification database, display the variable specification item on a customer terminal, and receive from the customer terminal a special order specification in which at least one of the variable specification items is changed, a conformity examination part configured to search for a combination of the movable unit so that the special order specification is realized, based on the information stored in the movable unit database and the part conformity examination result database, a robot presentation part configured to display on the customer terminal a virtual object of the robot that is the serially coupled body of the control unit, the searched combination of movable unit, and the end effector unit, and an ordering part configured to receive an order of a set or a part of the component units of the robot from the customer terminal, and accept the order.

Furthermore, a method of trading a robot according to still another aspect of the present disclosure, in which a serially coupled body of a control unit, an arm part comprised of at least one movable unit, and an end effector unit is used as a base robot, includes presenting at least one variable specification item of the base robot to the customer, receiving a special order specification in which at least one of the variable specification items is changed, and searching for a combination of the movable unit so that the special order specification is realized, presenting to the customer a virtual object of the robot that is the serially coupled body of the control unit, the arm part comprised of the searched combination of movable unit, and the end effector unit, and receiving a set or a part of an order of component units of the robot from the customer, and accepting the order.

According to the trading system of the robot and the method of trading the robot described above, even if the customer does not have a technical knowledge of the robot, he/she can order the robot customized to meet his/her own demanded specification. Moreover, since the virtual object of the robot is presented to the customer before the order for the robot, the customer can freely try the robot before the order. Moreover, the cost can be reduced corresponding to the non-intervention of any humans in the conformity examination, the designing, etc. of the robot, the robot manufacturer can offer the robot at low price, and the customer can acquire the customized robot at low price.

Effect of the Disclosure

According to the present disclosure, it can realize that the customer can freely try the customized robot which is customized to meet the customer's requirement specification, and can obtain the robot at low price.

MODES FOR CARRYING OUT THE DISCLOSURE

A trading system of a robot according to the present disclosure is a system which performs an electronic commerce of the robot by communicating electronic data through a network. The robot which is an object of the business transaction includes at least one robotic arm, and a controller which controls operation of the robotic arm, and may further include an end effector to be attached to a hand part of the robotic arm. Hereinafter, a first embodiment and a second embodiment of the present disclosure will be described.

First Embodiment

A trading system 1 according to the first embodiment of the present disclosure is described.

Figure 1:
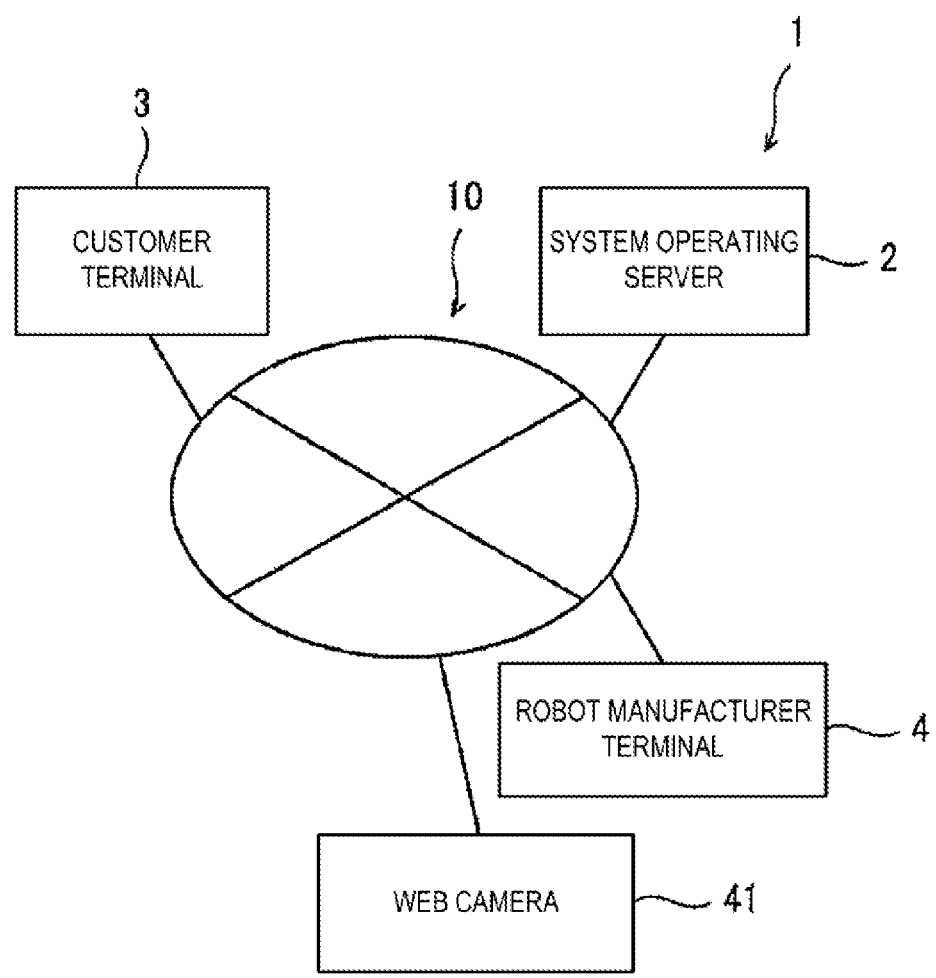
FIG. 1 is a view illustrating a network configuration of a trading system of a robot according to a first embodiment of the present disclosure.

FIG. 1 is a view illustrating a network configuration of the trading system 1 of the robot according to the first embodiment of the present disclosure. The trading system 1 of the robot illustrated in FIG. 1 includes a plurality of customer terminals 3, a system operating server 2, and a robot manufacturer terminal 4 which are connected by a network 10, such as the Internet. The customer terminals 3 and the system operating server 2 are communicably connected through the network 10. Moreover, the robot manufacturer terminal 4 and the system operating server 2 are communicably connected through the network 10. Note that, although not illustrated in this embodiment, the robot manufacturer terminal 4 and the customer terminals 3 may be communicably connected through the network 10.

Figure 2:
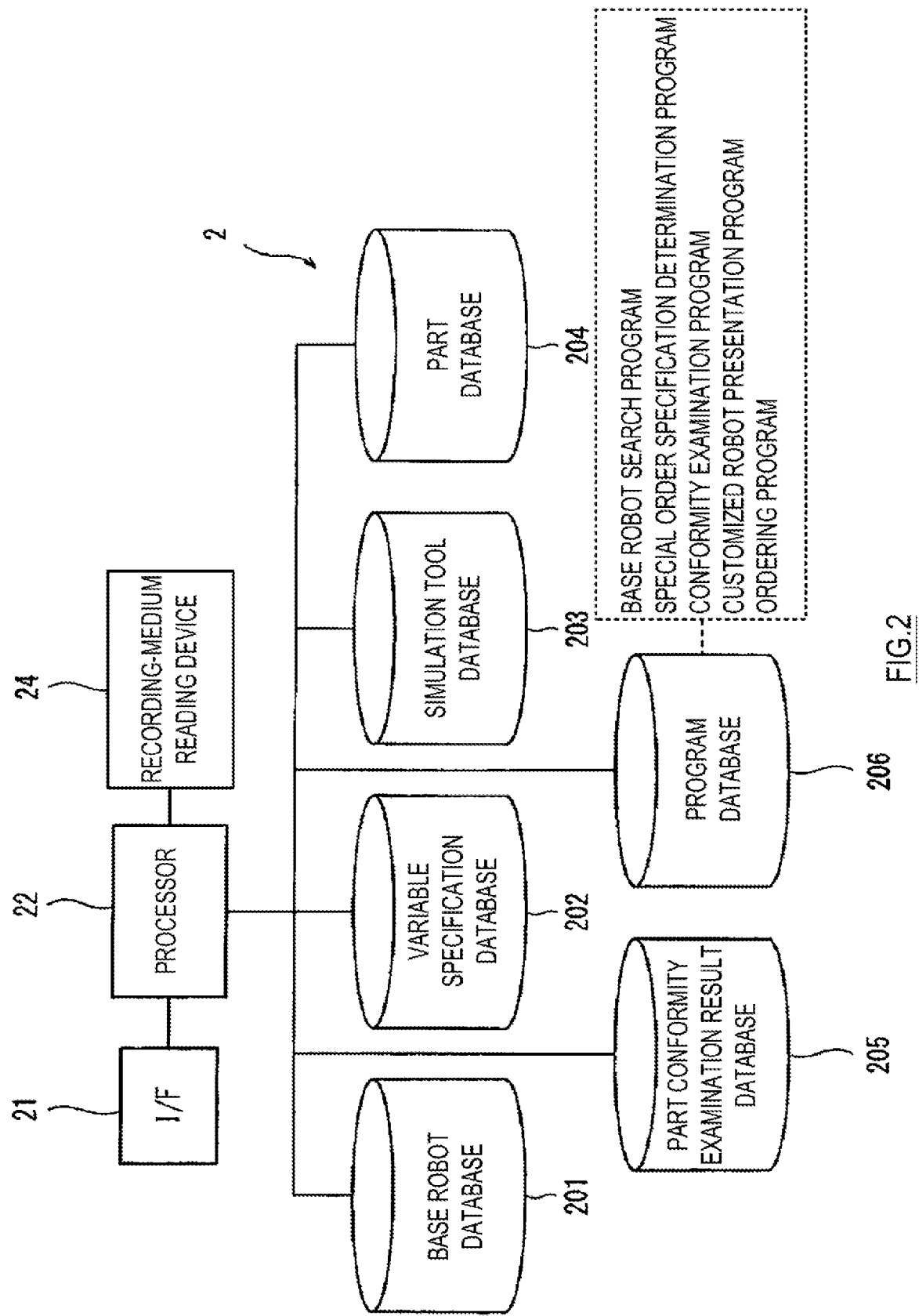
FIG. 2 is a view illustrating one example of a detailed configuration of a system operating server.

FIG. 2 is a view illustrating one example of a detailed configuration of the system operating server 2. The system operating server 2 illustrated in FIG. 2 includes an interface 21 which controls communication of information through the network 10, a processor 22 which is connected to the interface 21 and performs various processings in connection with the trade of the robot, and a recording-medium reading device 24 connected to the processor 22.

The processor 22 is connected to a storage device in which databases, such as a base robot database 201, a variable specification database 202, a simulation tool database 203, a part database 204, a part conformity examination result database 205, and a program database 206, are established. The processor 22 reads information stored in the storage devices, and stores information in the storage devices.

The base robot database 201 stores information on various base robots which become a base of a robot, for every base robot. The information on the base robot includes information, such as an identification number of a base robot, and performance and appearance of the base robot including a work classification which suits the base robot. Note that, for example, the work classifications of the robot include, as a large classification, an outdoor work, an indoor work, a high-place work, and a special environment work, and as a small classification, a conveyance of a lightweight object, a conveyance of a heavyweight object, offer of services, such as reception and guidance, and a fastening processing using a work tool, such as a screwdriver, machining, such as cutting, grinding, and polishing, processing using a special instrument, such as welding and painting. However, the work classification of the robot is not limited to the above examples.

The variable specification database 202 stores information on variable specification among a given basic specification of the base robot, for every base robot. From the variable specification database 202, for example, based on the identification number of base robot, the information on variable specification corresponding to the identification number can be extracted. The given basic specification of the base robot includes fixed specification and the variable specification. Among these, each item of the variable specification can be set according to a request from the customer. The variable specification items of the base robot may include at least one of an operating range, an operating posture, an operating vibration characteristic, an operating speed, a positioning accuracy, a path accuracy, a generating force, a load capacity, and price. The variable specification items of the base robot may differ for every base robot.

The operating range among the variable specification items is an operating range of a rotation center of a bending axis of a wrist of the robotic arm. A maximum operating range and a minimum operating range are defined for every base robot, and the requirement specification for the operating range can be set between the maximum operating range and the minimum operating range. The operating posture among the variable specification items is a posture of the robotic arm when the robot performs the work. The requirement specification of the operating posture can be selected from items, such as supporting a workpiece upward and suspending a workpiece downward. The operating vibration characteristic among the variable specification items is a frequency of vibration of a hand part when the robotic arm moves. A plurality of numerical values related to the operating vibration characteristic are defined for every base robot, and the requirement specification of the operating vibration characteristic can be selected from the given numerical values. The operating speed among the variable specification items is a moving speed of the hand part when the robotic arm moves. The operating speed range is defined for every base robot, and the requirement specification of the operating speed can be set within a given operating speed range. The positioning accuracy among the variable specification items is a deviation of an actual position of the hand part from an instructed position when the hand part of the robotic arm moves to the instructed position. A numerical value range of the positioning accuracy is defined for every base robot, and the requirement specification of the positioning accuracy can be set from a given numerical value range. The path accuracy among the variable specification items is a deviation of an actual path of the hand part from the instructed path when the hand part of the robotic arm moves to the instructed position from a reference position. A numerical value range of the path accuracy is defined for every base robot, and the requirement specification of the path accuracy can be set from a given numerical value range. The generating force among the variable specification items is a moment of force which can be generated at the hand part of the robotic arm. A numerical value range of the generating force is defined for every base robot, and the requirement specification of the generating force can be set from a given numerical value range. The load capacity among the variable specification items is the maximum weight of the workpiece which can be carried by the robotic arm. A numerical value range of the load capacity is defined for every base robot, and the requirement specification of the load capacity can be set from a given numerical value range. The price among the variable specification items is a selling price of the robot. A plurality of price ranges are defined for every base robot, and the requirement specification of the price can be selected from the plurality of price ranges.

The part database 204 stores information on component parts of the base robot, and parts attachable to the base robot for every parts. The component parts of the base robot include fundamental component parts, such as a pedestal, a link member, a joint member, a joint drive unit, and a controller. The robotic arm is formed by coupling link members through joint member(s). To each joint of the robotic arm, the joint drive unit which drives the joint is provided.

The part database 204 stores information on a plurality of types of pedestals of different sizes and shapes. Moreover, the part database 204 stores information on a plurality of types of link members of different materials and appearances. Each of the plurality of types of link members is variable in principle in the length of the link member (a dimension of the longitudinal direction) within a given range. The part database 204 stores information on a plurality of types of joint members of different functions and appearances. The plurality of types of joint members may differ in the joint connecting direction, connecting mode, etc. Moreover, the attaching position of the joint member to the link members may be variable within a given range. The part database 204 stores information on, as the joint drive unit, a plurality of types of actuators, power transmission mechanisms corresponding to the actuators, etc. The part database 204 stores information on a plurality of types of controllers. The plurality of types of controllers have different performances.

The part database 204 stores information on, as the parts attachable to the base robot, for example, a plurality of types of end effectors, such as a paint gun, welding gun, suction hand, placement hand, and grip hand. Moreover, the part database 204 stores information on, as the parts attachable to the base robot, for example, a plurality of types of dressings, such as air piping, hydraulic piping, and wiring.

The part conformity examination result database 205 stores information on combinations of the part information stored in the part database 204 which satisfies a special order specification (described later). The information stored in the part conformity examination result database 205 may be a database of work results of the conformity examination which the person in charge at the robot manufacturer has conventionally performed. Moreover, the information stored in the part conformity examination result database 205 may be simulation results of the conformity examination of parts performed under various conditions. Note that the result of a part conformity processing (described later) is sequentially added to the part conformity examination result database 205.

The program database 206 stores, for example, various programs for performing various processings related to the trade of the robot, such as a base robot search program, a special order specification determination program, a conformity examination program, a customized robot presentation program, and an ordering program.

Unless otherwise particularly illustrated, the various processings of the trading system 1 of the robot is performed by the processor 22 executing the various programs stored in the program database 206. In other words, by the processor 22 executing the program stored in the program database 206, the processor 22 functions as a processing part which performs processing in accordance with the program. However, the processing may be performed by the recording-medium reading device 24 connected to the processor 22 reading the program stored in the recording medium and the processor 22 executing the program. Moreover, the processing may be performed by a part or all of the various programs being sent to the customer terminal 3 through the network 10 and being performed by the customer terminal 3.

The simulation tool database 203 stores simulation tools, such as an operation simulating program, an appearance simulating program, and a cost simulating program. By the processor 22 reading each simulating program from the simulation tool database 203 and executing the program, the processor 22 functions as a simulator.

The appearance simulating program predicts an appearance of a virtual object of the customized robot where the conformity-examined parts are mounted to the base robot. The predicted appearance of the virtual object of the customized robot may be displayed on the customer terminal 3. The operation simulating program models the virtual object of the customized robot, and predicts behavior of the model. The predicted behavior of the virtual object of the customized robot may be displayed on the customer terminal 3. The cost simulating program calculates an anticipated cost based on the price, the shipping cost, etc. of the parts which constitute the virtual object of the customized robot. The calculated anticipated cost is displayed on the customer terminal 3.

Figure 3:
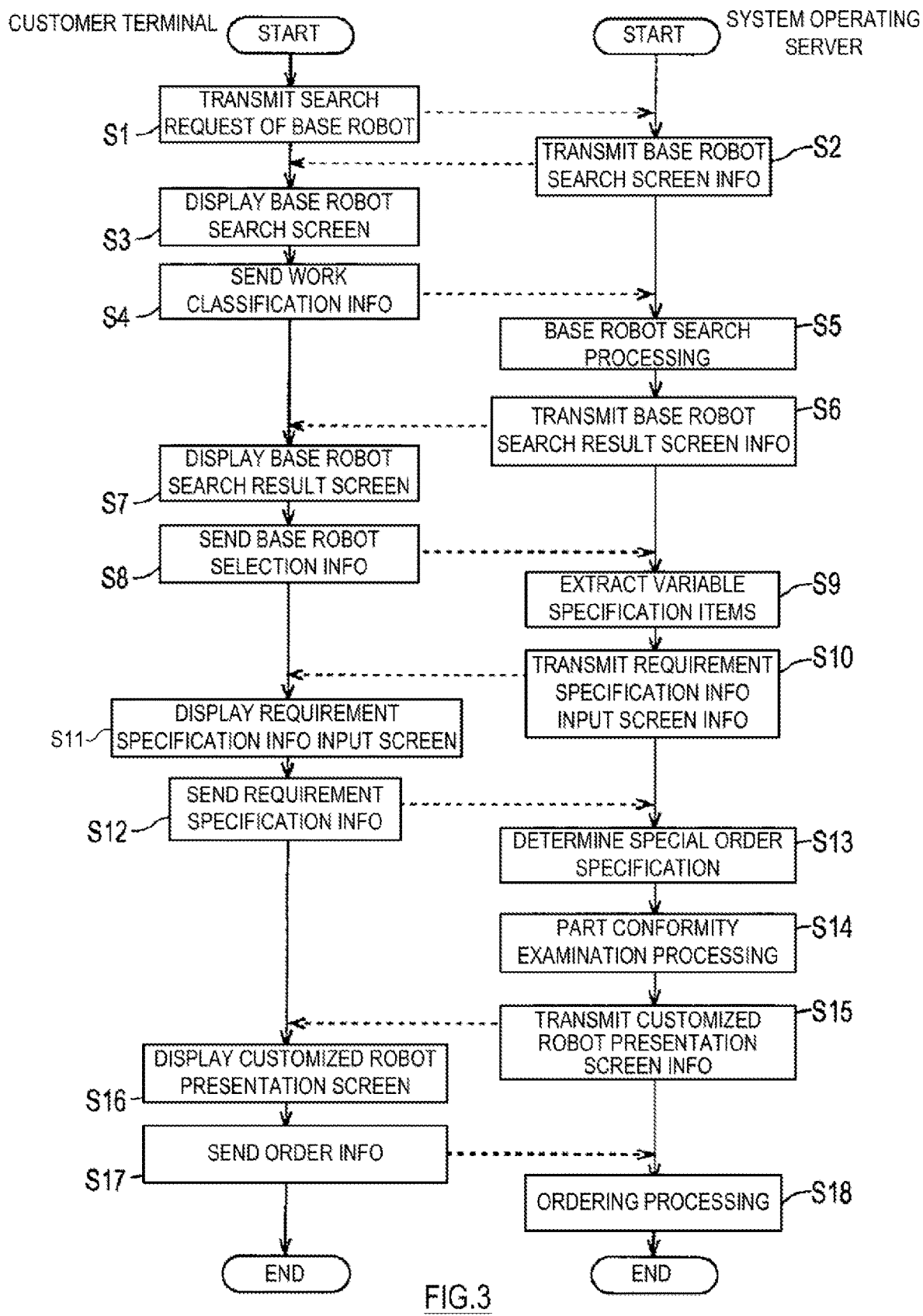
FIG. 3 is a sequence chart of a method of trading a robot.

Next, the method of trading the robot according to this embodiment is described using a sequence chart of FIG. 3. Note that, unless otherwise particularly illustrated, the exchange of the information between the customer terminal 3, the system operating server 2, and the robot manufacturer terminal 4 is performed by data communication through the network 10.

First, the customer accesses the system operating server 2 using the customer terminal 3, and the customer terminal 3 transmits a search request of the base robot which becomes the base of the robot which the customer wants to purchase (Step S1). In response to the search request, the system operating server 2 executes the base robot search program to transmit the base robot search screen 71 (see FIG. 4) to the customer terminal 3 (Step S2), and display it on a display device (a monitor etc.) of the customer terminal 3 (Step S3).

Figure 4:
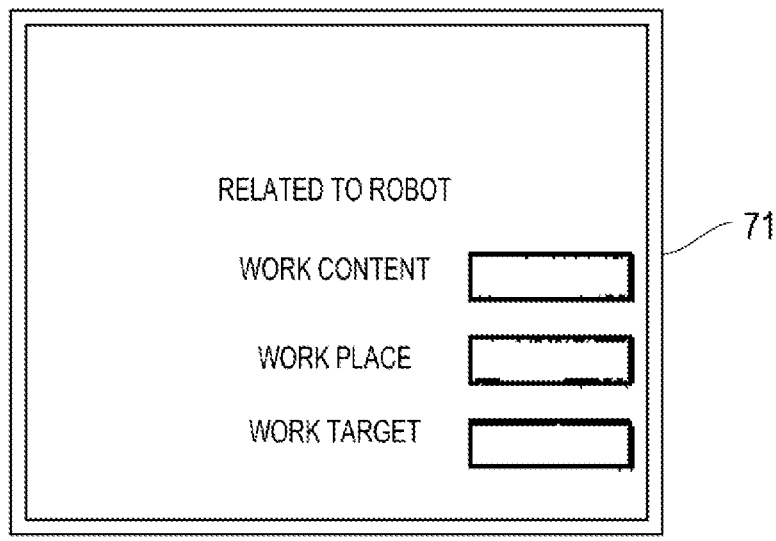
FIG. 4 is a view illustrating one example of a base robot search screen.

FIG. 4 is a view illustrating one example of a base robot search screen 71 displayed on the customer terminal 3. The customer inputs the work classification information on the work to be performed by the robot which the customer purchases into the customer terminal 3 according to guidance of the base robot search screen 71 displayed on the customer terminal 3. The customer terminal 3 sends the inputted work classification information to the system operating server 2 (Step S4). The system operating server 2 acquires the work classification information, and executes the base robot search program to perform the base robot search processing based on the acquired work classification information (Step S5). The system operating server 2 searches, in the base robot search processing, the base robot which suits the work classification information based on the base robot information stored in the base robot database 201, i.e., the base robot which is capable of performing the work according to the work classification information. By the search, the system operating server 2 searches for one or more base robots, transmits the base robot search result screen information including the characteristic and the appearance of the base robot to the customer terminal 3 (Step S6), and displays the base robot search result screen 72 (see FIG. 5) on the customer terminal 3 (Step S7).

Note that, upon the search for the base robot, a question-answer system based on artificial intelligence technology may be applied. That is, the system operating server 2 may repeat displaying a question on the customer terminal 3 and/or outputting voice of the question to the customer terminal 3 so as to ask the customer with natural language, and accepting a reply of natural language which the customer inputted into the customer terminal 3 to search for the base robot according to the request from the customer.

Figure 5:
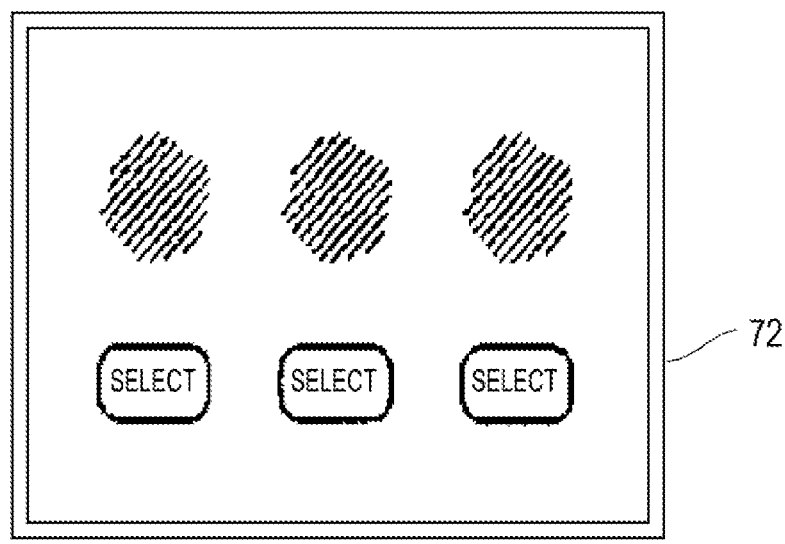
FIG. 5 is a view illustrating one example of a base robot search result screen.

FIG. 5 is a view illustrating one example of the base robot search result screen 72. In the base robot search result screen 72, one or more base robots are indicated as the information including the characteristic and the appearance. Further, an input part of the base robot selection information for inputting whether the searched base robots are to be adopted, or which one of the searched base robots is to be adopted, is provided in the base robot search result screen 72. If the customer does not adopt the searched base robot(s), the screen returns to the base robot search screen 71, and the base robot search processing is again repeated.

If the customer adopts the searched base robot, the customer terminal 3 sends the base robot selection information inputted by the customer to the system operating server 2 (Step S8). The system operating server 2 which acquired the base robot selection information executes the special order specification determination program to perform the special order specification determination processing. The system operating server 2 first, in the special order specification determination processing, extracts the variable specification items related to the base robot based on the base robot selection information (or the work classification information and the base robot selection information) from the variable specification database 202 (Step S9). Note that, what does not related to the already-acquired work classification information among the variable specification items associated with the base robot may be excluded from the extraction.

The system operating server 2 transmits to the customer terminal 3 the requirement specification input screen information for displaying each of the extracted variable specification items, and the input demand of the requirement specification information including at least one specification among the variable specification items, in a combined or individual manner (Step S10), and displays the requirement specification input screen 73 (see FIG. 6) on the customer terminal 3 (Step S11).

Figure 6:
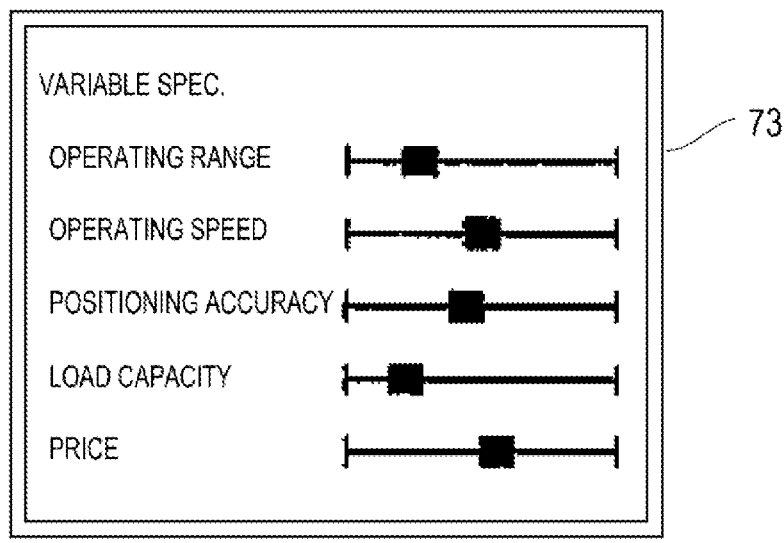
FIG. 6 is one example of a requirement specification input screen.

FIG. 6 illustrates one example of the requirement specification input screen 73 displayed on the customer terminal 3. In the requirement specification input screen 73, the selected variable specification items of the base robot and a requirement specification information input part for the variable specification items are provided. The requirement specification information input part is, for example, a slider corresponding to the variable range of the variable specification item, and the customer moves the slider in the screen to input the requirement specification information for each variable specification item.

Note that the presented variable specification items include at least one of the operating range, the operating posture, the operating vibration characteristic, the operating speed, the positioning accuracy, the path accuracy, the generating force, the load capacity, and the price. Each variable specification item is not to directly derive a component part of the robot, such as "the length of the link member, the motor output . . . ," but is such an item that the customer can intuitively understand the work (operation) to be performed by the robot, such as "the operating range, the load capacity . . . ."

The customer terminal 3 sends the inputted requirement specification information to the system operating server 2 (Step S12). The system operating server 2 which acquired the requirement specification information determines the special order specification of the robot which adopted the requirement specification information for the variable specification items for which the requirement specification information is inputted, and adopted given standard specifications for the remaining variable specification items (Step S13). That is, the special order specification of the robot uses the basic specification peculiar to the base robot as the base, where a part or all of the variable specification items of the basic specification are replaced by the requirement specification.

Note that, in the above, the requirement specification information provided from the customer directly corresponds to the special order specification of the robot. However, the system operating server 2 may calculate it based on work target information provided from the customer and work content information to determine the special order specification of the robot. The work target information is information on a work target of the robot, and includes, for example, at least one of information, such as the dimension, number, weight, and outer shape of the work target. Moreover, the work content information is information on the work which the robot performs to the work target, and includes, for example, at least one of information, such as the number of processes, conveying distance, conveying location, and the tool to be used, of the robot. For example, when determining the special order specification of the robot, the system operating server 2 may repeat displaying a question on the customer terminal 3 and/or outputting voice of the question to the customer terminal 3 to ask the question to the customer, and accepting a reply which the customer inputted into the customer terminal 3 to acquire the work target information and the work content information, and determine the special order specification based on the work target information and the work content information which are acquired. The system operating server 2 defines the requirement specification for at least one of the variable specification items such that, for example, when the work target information is two 2-liter bottles of water, and the work content information is conveyance of 1 meter and alignment of the bottles, the load capacity is set as 2 kg, the operating range as 1 meter, the positioning accuracy as moderate, and the path accuracy as moderate, and determines the special order specification of the robot so as to include the requirement specifications. Note that, regarding the processing for determining the requirement specification based on the combination of the work target information and the work content information (or directly determining the special order specification), the requirement specification (or directly the special order specification) can be determined, for example, by repeatedly learning from a large number of teacher data beforehand to analyze a rule, and applying the rule to data to be processed.

The system operating server 2 which determined the special order specification of the robot as described above executes the conformity examination program to perform the part conformity examination processing (Step S14). In the part conformity examination processing, the system operating server 2 refers to the part conformity examination result database 205 and searches the parts stored in the part database 204 for a combination of the component parts of the robot including the component parts of the base robot so that the special order specification is realized.

The system operating server 2 searches for data corresponding to the special order specification while referring to the part conformity examination result database 205, and there is corresponding data, it determines the combination of the component parts of the robot based on the data. On the other hand, if there is no data corresponding to the special order specification as a result of the system operating server 2 referring to the part conformity examination result database 205, the system operating server 2 learns the data stored in the part conformity examination result database 205 to analyze the rule, applies this rule to the special order specification to predict data which satisfies the special order specification, and determines the combination of the component parts of the robot.

For example, in the part conformity examination processing, the system operating server 2 searches for the combination and the configuration of the parts including the materials of the link members, and the lengths of the link members, the joint members, and the joint drive units so that the requirement specification of the operating range and the requirement specification of the load capacity are realized collectively. Moreover, for example, in the part conformity examination processing, the system operating server 2 searches for the combination and the configuration of the parts including the materials of the link members, the joint members, the joint drive units, and the controller so that the special order specification of the positioning accuracy and the special order specification of the operating speed are realized collectively.

After the search for the component parts of the robot is finished, the system operating server 2 executes the customized robot presentation program to perform the customized robot presentation processing. In the customized robot presentation processing, the system operating server 2 transmits the customized robot presentation screen information to the customer terminal 3 (Step S15), and displays the customized robot presentation screen 74 (see FIG. 7) on the customer terminal 3 (Step S16). Here, the system operating server 2 may utilize the simulation tool stored in the simulation tool database 203 and display on the customer terminal 3 the virtual object of the robot where the searched parts are mounted to the base robot.

Figure 7:
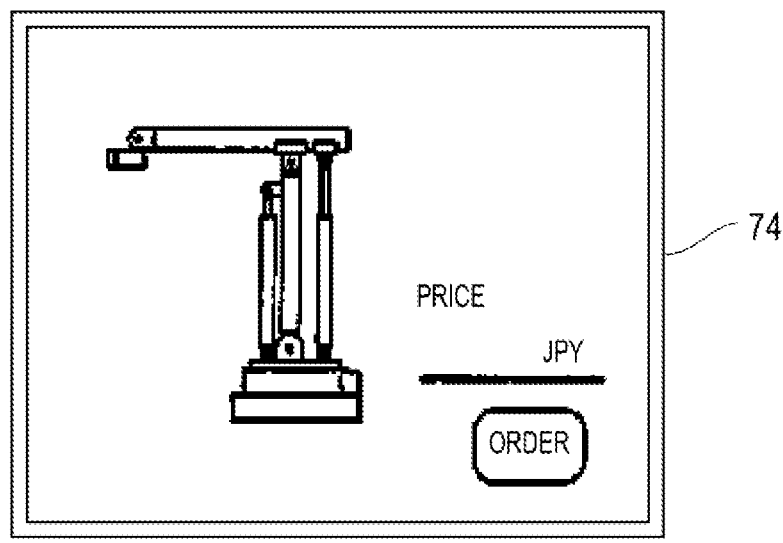
FIG. 7 is one example of a customized robot presentation screen.

FIG. 7 illustrates one example of the customized robot presentation screen 74. In the customized robot presentation screen 74, the virtual object of the robot of the special order specification which is customized based on the customer's requirement specification as described above is displayed. This virtual object may be displayed as a still image, or may be displayed as an animation which performs the work, or may be displayed so that virtual object operates in the screen according to operation of the customer. Thus, the customer can visually observe the customized robot presentation screen 74 and operate the virtual object of the robot in the screen to freely try the customized robot customized by his/her own requirement specification.

In addition, a quotation of the robot is displayed on the customized robot presentation screen 74 (this may be displayed in a separate screen from the screen where the virtual object of the robot is displayed). Thus, the customer can know the price of the robot before purchasing the robot.

Further, the customized robot presentation screen 74 (this may be a separate screen from the screen where the virtual object and the quotation of the robot are displayed) is provided with an order input part for the displayed robot. The customer can determine a purchase of the robot, after trying the virtual object of the robot. When the customer purchases the robot, an order is inputted into the order input part, and the order information is sent to the system operating server 2 from the customer terminal 3 (step S17). Note that the order information may include information for identifying the robot presented in the customized robot presentation screen 74, information on the customer such as, a shipping address and a user, and payment information, such as a payment method.

The system operating server 2 which received the order information executes the ordering program to perform ordering processing of the robot (step S18). The system operating server 2 generates, in the ordering processing, delivery list information including a set of assembly parts of the robot for which the order has been received. Note that each assembly part is based on a unit of assembly when the customer assembles the robot. The generated delivery list information is sent to the robot manufacturer terminal 4 from the system operating server 2.

The robot manufacturer terminal 4 which received the delivery list information generates manufacturing schedule information on the assembly parts. The assembly parts and manufacturing schedule information thereof are given to a manufacturing section of the robot manufacturer. Moreover, the manufacturing schedule information on the assembly parts is sent to the customer terminal 3 along with an address and an access key which enable the customer terminal 3 to access the manufacturing section.

In the manufacturing section of the robot manufacturer, a web camera 41 (see FIG. 1) is installed at a processing location of the assembly parts. The customer terminal 3 accesses the web camera 41 of the manufacturing section of the robot manufacturer at a timing of the manufacturing schedule information on the assembly parts to display an image of the processing site of the assembly parts on the screen of the customer terminal 3. The customer can know the progress and the situation of the processing by viewing the image of the processing site of the assembly parts displayed on the screen of the customer terminal 3.

Figure 8:
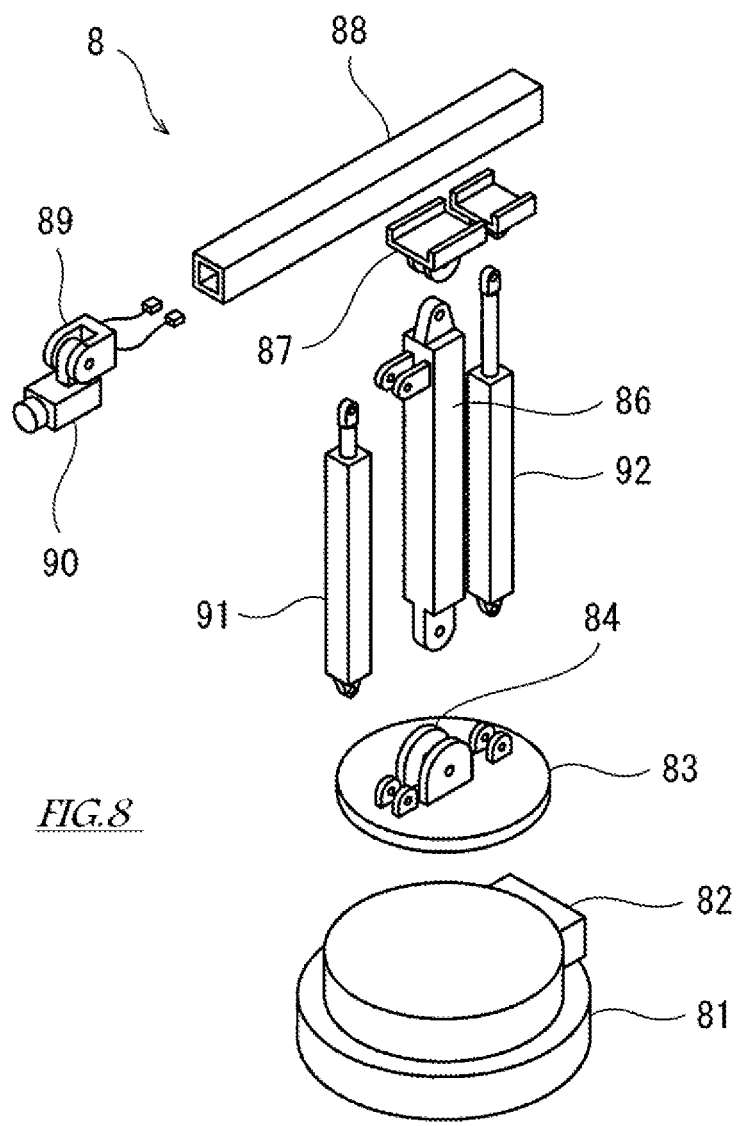
FIG. 8 is a view illustrating one example of the assembly parts of the robot.
Figure 9:
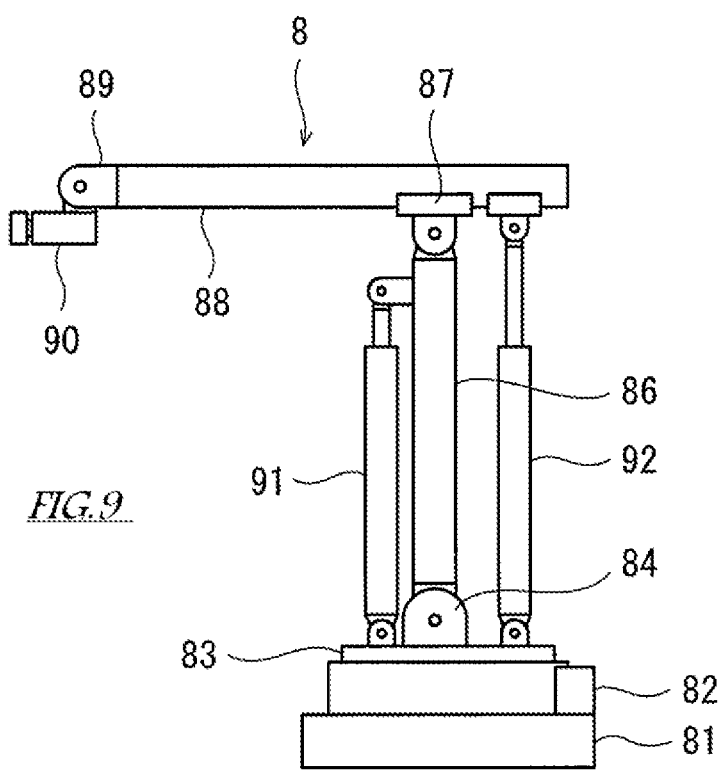
FIG. 9 is a view illustrating the robot after the parts of FIG. 8 are assembled.

FIG. 8 is a view illustrating one example of the assembly parts of the robot, and FIG. 9 is a view illustrating the robot to which the assembly parts of FIG. 8 are assembled. Note that the controller is omitted in FIGS. 8 and 9.

The robot 8 illustrated in FIGS. 8 and 9 includes a pedestal 81, a turn table 83 turnably supported with respect to the pedestal 81, a first link 86 coupled to the turn table 83 through a joint member 84, a second link 88 coupled to the first link 86 through a joint member 87, an end effector 90 coupled to a tip-end part of the second link 88 (i.e., the hand part of the robotic arm) through a joint member 89, and joint drive units 91 and 92. The pedestal 81 is provided with an interface 82 to which a controller (not illustrated) is connected through wiring.

The first link 86 and the second link 88 are each comprised of a square pipe and capable of easily adjusting the length of the link by changing the cutting length of the square pipe when being manufactured. Moreover, the joint member 87 which connects the first link 86 to the second link is fixed to the second link 88 by fitting or threadedly engagement. Therefore, during the manufacture of the second link 88, an attaching position of the joint member 87 to the second link 88 (i.e., a coupling position to the first link 86) can easily be changed by changing the position of a threaded hole or a fitting part formed in the second link 88. As described above, the robot 8 is configured so that not only the parts but also the shapes of the parts can be customized according to the customer's requirement specification.

Figure 10:
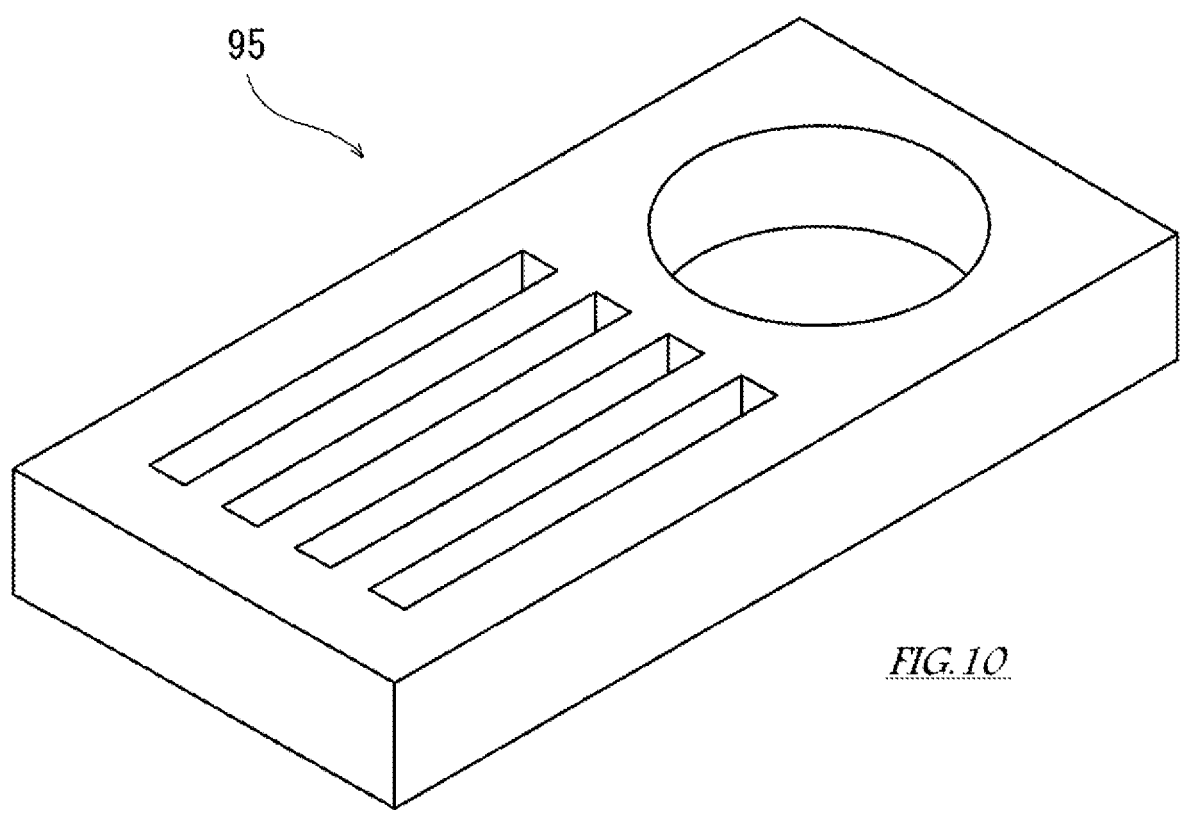
FIG. 10 is a view illustrating one example of a box for packing.

The robot 8 is packed in a packing box 95 as illustrated in FIG. 10 in a state of the assembly parts, i.e., in an unfinished product state. Then, the set of assembly parts is shipped from the robot manufacturer to the customer as a packaged assembly kit. An operation program of the robot may be handed to the customer as a recording medium which stores the program, or may be installed beforehand in the controller.

The customer who received the assembly kit of the robot completes the robot by assembling the assembly parts, while referring to an attached assembly drawing. Note that the assembly parts of the robot are configured so that the assembling operation of the robot can be performed using comparatively easy fastening methods, such as screw fastening, fitting, and adhesion. Thus, the robot is configured so that it can be assembled easily at the customer's end, and it is handed over to the customer as the assembly kit where the set of assembly parts is all included. That is, the robot is handed to the customer as a DIY (Do It Yourself) robot assembly kit, and the customer can assemble the kit on the spot, without obtaining other parts.

As described above, the trading system 1 of the robot of this embodiment is a trading system of a robot which trades a robot. The trading system 1 includes the variable specification database 202 which stores the information on the variable specification among the given basic specification of the base robot for every base robot which is a base of the robot, a special order specification determination part which receives the selection of the base robot from the customer terminal 3, extracts the variable specification items of the base robot selected from the variable specification database, and determines the special order specification where at least one of the variable specification items is changed from the basic specification, the part database 204 which stores the information on the component parts of the base robot and the parts attachable to the base robot, a conformity examination part which searches for the combination of the parts which constitute the robot which realizes the special order specification, from the parts stored in the part database 204, a customized robot presentation part which displays on the customer terminal 3 the virtual object of the robot where the searched parts are mounted to the base robot, and an ordering part which receives the order for the robot from the customer terminal 3 and accepts the order for the robot.

Note that, in this embodiment, the processor 22 of the system operating server 2, which executes the special order specification determination program, functions as the special order specification determination part, the processor 22 of the system operating server 2, which executes the conformity examination program, functions as the conformity examination part, the processor 22 of the system operating server 2, which executes the customized robot presentation program, functions as the customized robot presentation part, and the processor 22 of the system operating server 2, which executes the ordering program, functions as the ordering part. Note that at least one of the functional parts, such as the variable specification presentation part, the conformity examination part, and the customized robot presentation part is realized by the customer terminal 3 downloading and executing the corresponding program.

Moreover, although the trading system 1 of the robot according to this embodiment is based on communicating the electronic data through the network 10 between the system operating server 2 and the customer terminal 3, the trading system 1 of the robot may be realized by processing inside a single computer.

Similarly, the method of trading the robot according to this embodiment includes urging the customer a selection of the base robot which becomes the base of the robot, receiving the selection of the base robot, extracting the variable specification items of the selected base robot from the information group related to the variable specification among the given basic specification of the base robot, determining the special order specification where at least one of the variable specification items is changed from the basic specification, searching the information group related to the component parts of the base robot and the parts attachable to the base robot for the parts which constitute the robot which realizes the special order specification, presenting the customer the virtual object of the robot where the searched parts are mounted to the base robot, urging the customer the input of the order for the robot, receiving the order for the robot, and accepting the order for the robot.

According to the trading system 1 of the robot and the method of trading the robot, since the virtual object of the customized robot which is customized to meet the customer's requirement specification is presented to the customer, the customer can freely try the customized robot. Moreover, since the configuration of the robot customized to meet the customer's requirement specification is determined by the communication of the electronic data through the network 10, the cost can be reduced corresponding to non-intervention of any humans in the conformity examination, the designing, etc. of the robot, the robot manufacturer can offer the robot at low price, and the customer can acquire the customized robot at low price.

Moreover, the trading system 1 of the robot according to this embodiment further includes the base robot database 201 which stores the information on the base robot including the work classification which suits the base robot, and a base robot search part which receives, before receiving the selection of the base robot from the customer terminal 3, the work classification information on the work to be performed by the robot from the customer terminal 3, searches for one or more base robots which suit the work classification based on the work classification information from the base robot database, and displays the searched base robot on the customer terminal 3.

Note that, in this embodiment, the processor 22 of the system operating server 2 which executes the base robot search program functions as the base robot search part. Note that the customer terminal 3 may download and executing the corresponding program to function as the base robot search part.

Similarly, the method of trading the robot according to this embodiment includes, before urging the customer the selection of the base robot, urging the customer the input of the work classification information on the work classification to be performed by the robot, receiving the work classification information, searching for one or more base robots which suit the work classification from the information group related to the base robot including the work classification which suits the base robot, and presenting the searched base robot to the customer.

Thus, based on the work to be performed by the robot, the base robot which suits the work is proposed to the customer among the plurality of base robots. Therefore, even if the customer does not have the knowledge about the robot, he/she can select the base robot suitable for the content of the work to be performed by the robot. Note that the functional part and the process for searching the base robot may be omitted if the base robot which the robot manufacturer proposes is one type.

Moreover, in the trading system 1 of the robot according to this embodiment, the special order specification determination part (the processor 22 of the system operating server 2 which executes the special order specification determination program) displays the variable specification items and the input demand of the requirement specification information for at least one of the variable specification items on the customer terminal 3, receives the requirement specification information from the customer terminal 3, and determines the special order specification based on the received requirement specification information. According to this, the customer can set a desired variable specification item as the requirement specification.

Note that the special order specification determination part may receive from the customer terminal 3 the work target information on the work target of the robot, and the work content information on the work which the robot performs to the work target, and determine the special order specification based on the work target information and the work content information. According to this, even if the customer does not have the knowledge about the robot, the special order specification determination part can determine the special order specification of the robot based on the intuition of the customer.

Moreover, in the trading system 1 of the robot according to this embodiment, the ordering part receives the order for the robot and generates the delivery list including the set of assembly parts of the robot.

Similarly, the method of trading the robot according to this embodiment further includes receiving the order for the robot, and generating the delivery list including the set of assembly parts of the robot. In this case, the robot may be shipped to the customer in the state of the assembly kit where the set of assembly parts of the robot is packed.

Thus, according to handing the robot to the customer as the set of assembly parts, the customer can assemble the robot on that spot, without obtaining other parts. Moreover, according to the recent world situation from a viewpoint of the terrorism prevention, the export of the assembly products (for example, a robot) which have advanced technologies may be restricted. Therefore, the assembly products may undergo a careful inspection when carrying into a country, and depending on a result of the inspection, they may be subjected to a breakdown investigation. On the other hand, when the robot is carried into a country in the state of the assembly kit like this case, the configuration of each part is apparent. Therefore, the assembly kit can pass through the custom, without becoming subjected to the breakdown investigation.

Moreover, in the trading system 1 of the robot and the method of trading the robot which are illustrated in this embodiment, the variable specification items include at least one of the operating range, the operating posture, the operating vibration characteristic, the operating speed, the positioning accuracy, the path accuracy, the generating force, the load capacity, and the price.

Thus, since the variable specification items are items which the customer can intuitively understand the work (operation) to be performed by the robot, the customer can order the robot which performs the desired work, even if the customer does not have the knowledge about the structure of the robot.

Second Embodiment

A trading system 101 according to a second embodiment of the present disclosure is described.

[Configuration of Robot 108]

Figure 11:
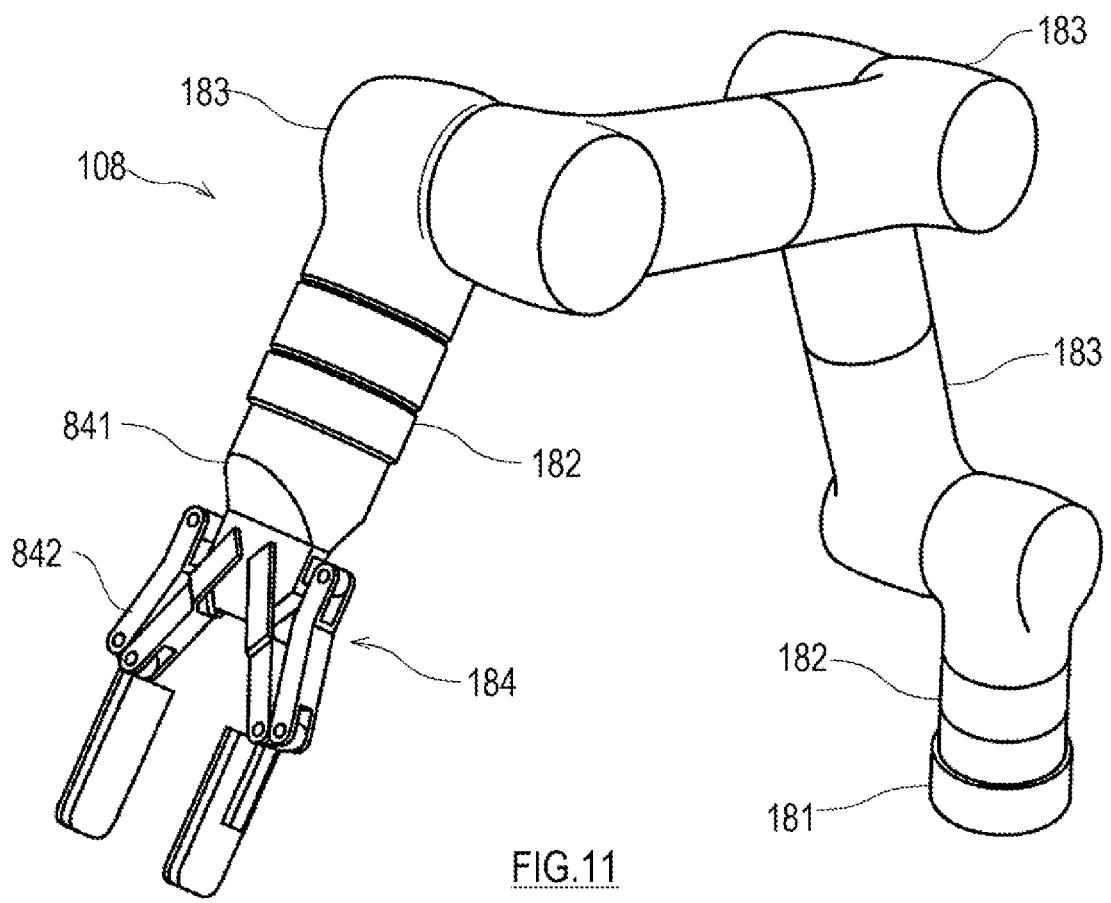
FIG. 11 is a view illustrating one example of a robot which is an object of a business transaction in a trading system of the robot according to a second embodiment of the present disclosure.

FIG. 11 illustrates one example of a robot 108 which is an object of the business transaction of a trading system 101 of the robot according to the second embodiment of the present disclosure. As illustrated in FIG. 11, the robot 108 is a serially coupled body of a control unit 181, at least one movable unit 182, 183, and an end effector unit 184. The movable units 182 and 183 include a rotation unit 182 and a bending unit 183. The robot 108 is used with a base (not illustrated) which holds the control unit 181, such as a wall-hanging base, a ceiling-suspending base, a floor-type base, and a clip-type base. The clip-type base has a clip for attaching the robot 108 to a stand, a frame, etc.

The control unit 181 has a cylindrical shape, and has a controller which controls operation of the robot 108, and an electric power unit (none of them is illustrated) which are built therein. A connection interface of a circular shape is provided to one of end faces of the control unit 181.

The rotation unit 182 is formed by coupling two stacked short cylinders so as to be rotatable on the centerlines thereof as a rotation center, and has a cylindrical shape as a whole. The rotation unit 182 has a motor, a transmission, and a motor driver (none of them is illustrated) which are built therein, for rotating one of the two short cylinders with respect to the other. A connection interface of a circular shape is provided on both end surfaces of the rotation unit 182.

The bending unit 183 is formed by two cylindrical links being coupled with each other through a bending joint. In other words, the bending unit 183 is formed by coupling the two links so as to be rotatable centering on a rotation axis perpendicular to the longitudinal directions of the two links. The bending unit 183 has a motor, a transmission, and a motor driver (none of them is illustrated) which are built therein, for rotating one of the two links with respect to the other. A connection interface of a circular shape is provided on an end face opposite from the joint of each link of the bending unit 183.

The end effector unit 184 is comprised of a base part 841 to which the connection interface of the circular shape is provided, and a tool part 842. The base part 841 has a motor, a transmission, and a motor driver (none of them is illustrated) which are built therein, for operating the tool part 842. Although the end effector unit 184 illustrated in FIG. 11 is a chuck which grips a workpiece, the mode of the tool part 842 of the end effector unit 184 is not limited to this configuration.

The robot 108 is a customizable robot which can change component units according to a request from the customer. The connection interface provided to each of the units 181-184 is common or corresponds to each other and, thus, the connection interfaces of the units 181-184 can be coupled to each other freely. For example, the rotation unit 182 can be selectively coupled to the control unit 181, the other rotation unit 182, the bending unit 183, and the end effector unit 184. Moreover, for example, the bending unit 183 can be selectively coupled to the control unit 181, the rotation unit 182, the other bending unit 183, and the end effector unit 184.

The robot 108 illustrated in FIG. 11 is a vertical articulated 5-axes robot where the units are coupled in series, in the order of the control unit 181, the first rotation unit 182, the first bending unit 183, the second bending unit 183, the third bending unit 183, the second rotation unit 182, and the end effector unit 184. By rearranging the arm part of the robot 108 (i.e., the part comprised of at least one movable unit), a degree of freedom, an operating range, etc. of the robot 108 can be changed.

Figure 12:
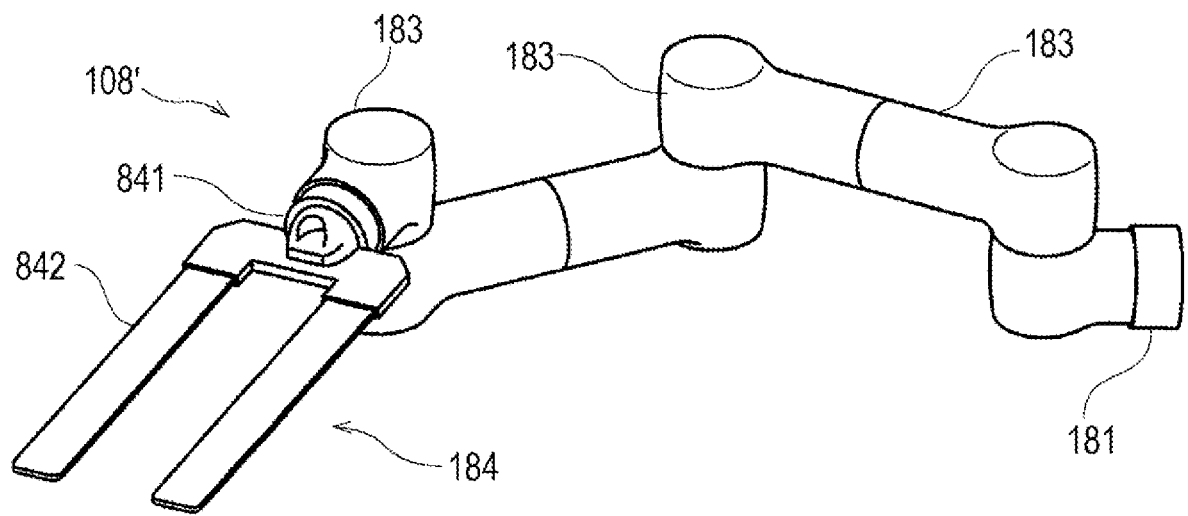
FIG. 12 is a view illustrating another example of the robot which is an object of the business transaction of the trading system of the robot according to the second embodiment of the present disclosure.

For example, the robot 108' illustrated in FIG. 12 is a horizontal articulated 3-axes robot where the units are coupled in series, in the order of the control unit 181, the first bending unit 183, the second bending unit 183, the third bending unit 183, and the end effector unit 184. The tool part 842 of the end effector unit 184 of the robot 108' is, for example, a blade for work conveyance for scooping up a lightweight workpiece, such as a substrate, from the bottom and holds the workpiece.

The robot 108 illustrated in FIG. 11 and the robot 108' illustrated in FIG. 12 are common in the control unit 181 and 3 sets of the bending units 183. The robot 108 can be converted into a horizontal articulated type by using a part or all of the component units of the robot 108 illustrated in FIG. 11. Similarly, the robot 108 can be converted into a horizontal articulated type by adding some units (for example, the rotation unit 182) to the component units of the robot 108' illustrated in FIG. 12.

[Configuration of Trading System 101 of Robot]

The trading system 101 of the robot according to this embodiment performs the business transaction of the robot 108. Although the robot 108 can be customized according to the request from the customer, it is difficult for the customer who does not have a technical knowledge of the robot to examine how to configure the robot 108 which performs the operation according to the request, without an appropriate guidance. Thus, in the trading system 101 of the robot, even if the customer does not have such a technical knowledge, he/she can easily design the customized robot which is customized to meet the requirement specification, freely try the robot, and obtain the robot at low price.

Figure 13:
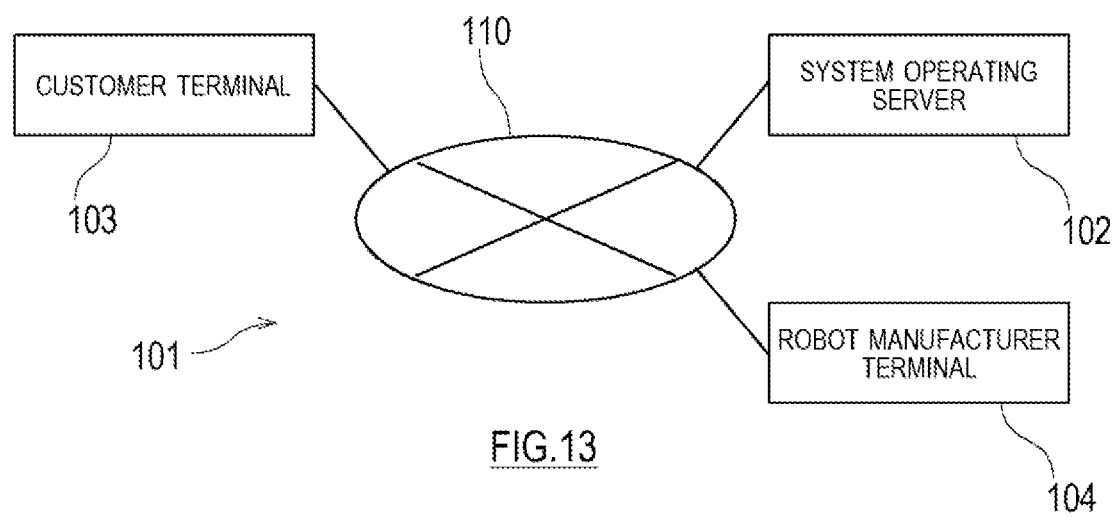
FIG. 13 is a view illustrating a network configuration of the trading system of the robot according to the second embodiment of the present disclosure.

FIG. 13 is a view illustrating a network configuration of the trading system 101 of the robot according to the second embodiment of the present disclosure. As illustrated in FIG. 13, the trading system 101 of the robot includes a customer terminal 103 connected through the network 110, such as the Internet, a system operating server 102, and a robot manufacturer terminal 104. Data communication is possible between the customer terminal 103 and the system operating server 102 through network 110. Moreover, data communication is possible between the robot manufacturer terminal 104 and the system operating server 102 through the network 110. Note that, although not illustrated in this embodiment, data communication may be performed between the robot manufacturer terminal 104 and the customer terminal 103 through the network 110.

Figure 14:
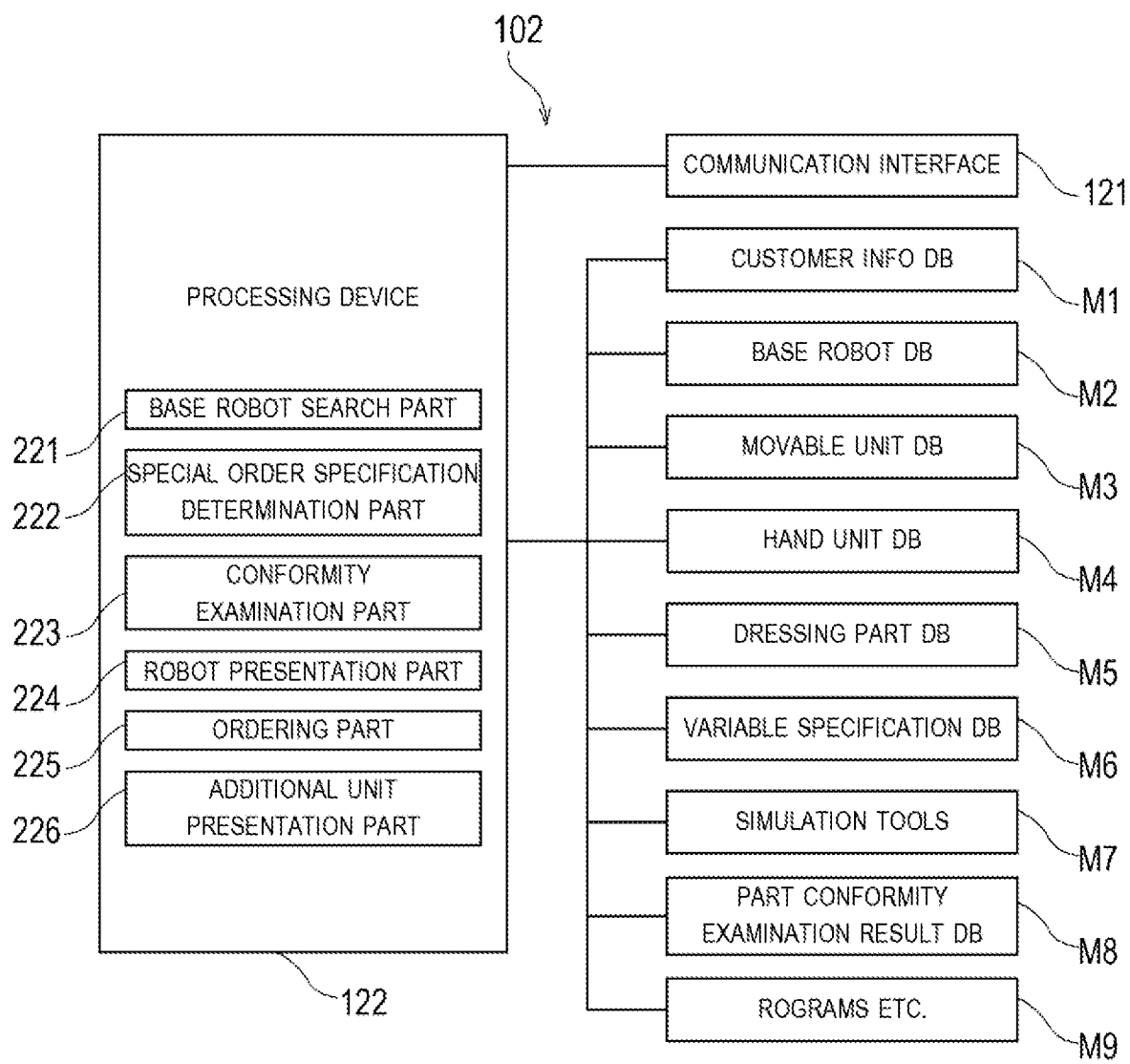
FIG. 14 is a view illustrating one example of a detailed configuration of a system operating server.

FIG. 14 is a view illustrating one example of a detailed configuration of the system operating server 102. As illustrated in FIG. 14, the system operating server 102 includes a communication interface 121, a processing device 122, and storage devices M1-M9. Note that, in FIG. 14, boxes attached with reference characters M1-M9 represent the storage devices, and the contents illustrated inside the boxes represent information stored in the respective storage devices.

The processing device 122 is a computer having a processor, such as a CPU, a memory, such as a ROM and/or a RAM, and performs various processings in connection with the trade of the robot by the CPU executing given programs stored beforehand in the memory, the storage devices M7 and M9.

The communication interface 121 controls communication of information through the network 110 by being controlled by the processing device 122.

Data, programs, etc. which are used for the various processings in connection with the trade of the robot are stored in the storage devices M1-M9. The processing device 122 can read the information stored in the storage devices M1-M9, and can cause the storage devices M1-M9 to store the information.

In the storage device M1, a customer information database where customer information is stored is established. The customer information includes customer IDs, names of customers, customer addresses, purchase histories, etc. The purchase history includes information on the component units of the robot possessed by the customer. The processing device 122 can read the customer information stored in the customer information database based on the customer ID.

In the storage device M2, a base robot database where base robot information is stored is established. The base robot information includes base robot information of the vertical articulated type and base robot information of the horizontal articulated type. The vertical articulated base robot information includes an identification number of base robot, and a basic configuration of the robot. Moreover, the horizontal articulated base robot information includes an identification number of base robot, and a basic configuration of the robot. The basic configuration of the robot includes a serial configuration of the control unit 181, the bending unit 183, and the end effector unit 184, which are the minimum configuration of the robot. Further, the base robot information includes performance information, such as the work classification which suits the base robot. The work classification of the robot includes, for example, conveyance of a lightweight object, offer of services, such as reception and guidance, fastening processing using a work tool, such as a screwdriver, machining, such as cutting, grinding, and polish, processing using a special instrument, such as welding and paint. Note that work classification of the robot is not limited to the above.

In the storage device M3, a movable unit database where information on the rotation unit 182 and the bending unit 183 which are the movable units is stored is established. Although there is only one type in principle for each of the rotation unit 182 and the bending unit 183, the plurality of types, such as a high power type of different motor output, and a long type of different unit length, may be provided.

In the storage device M4, an end effector unit database where information on the end effector unit 184 is stored is established. As for the end effector unit 184, a plurality of types of which the tool part 842 is different one from another are provided, such as a paint gun, a welding gun, a suction hand, a placement hand, and a grip hand.

In the storage device M5, a dressing part database stored so as to associate information on the dressing parts (for example, air piping, hydraulic piping, wiring, etc.) corresponding to the end effector unit 184 with the type of the end effector unit 184 is established. The dressing parts can be attached to the robot.

In the storage device M6, a variable specification database which stores information on the variable specification for every base robot among the specification of the base robot is established. The processing device 122 can read from the variable specification database, for example, based on the identification number of base robot, information on the corresponding variable specification. The information on the variable specification includes variable specification items of the base robot, and initial values of the items. The variable specification item of the base robot includes, for example, the number of axes, and the operating range. Note that, when a plurality of types of rotation unit 182 and/or bending unit 183 having different motor outputs are provided, the variable specification item may further include at least one of the operating vibration characteristic, the operating speed, the positioning accuracy, the path accuracy, the generating force, the load capacity, and the price range. The variable specification items of the base robots may differ for every base robot.

The number of axes among the variable specification items is the number of joints of the robot, and the number of units which constitute the robot varies according to the number of axes. The operating range among the variable specification items is, for example, an operating range of a hand reference point given to the end effector unit 184, from the origin of the robot coordinates given to the control unit 181. The operating posture among the variable specification items is a posture of the end effector unit 184 when the robot performs the work. The requirement specification of the operating posture can be selected from items, such as supporting a workpiece upward and suspending a workpiece downward. The operating vibration characteristic among the variable specification items is a frequency of vibration of the hand reference point when the robot operates. A plurality of numerical values related to the operating vibration characteristic are defined for every base robot, and the requirement specification of the operating vibration characteristic can be selected from the given numerical values. The operating speed among the variable specification items is a moving speed of the hand reference point when the robot operates. The operating speed range is defined for every base robot, and the requirement specification of the operating speed can be set within a given operating speed range. The positioning accuracy among the variable specification items is a deviation of an actual position of the hand reference point from an instructed position when the hand reference point moves to the instructed position. A numerical value range of the positioning accuracy is defined for every base robot, and the requirement specification of the positioning accuracy can be set from a given numerical value range. The path accuracy among the variable specification items is a deviation of an actual path of the hand part from the instructed path when the hand reference point moves to the instructed position from a reference position. A numerical value range of the path accuracy is defined for every base robot, and the requirement specification of the path accuracy can be set from a given numerical value range. The generating force among the variable specification items is a moment of force which can be generated at the hand reference point. A numerical value range of the generating force is defined for every base robot, and the requirement specification of the generating force can be set from a given numerical value range. The load capacity among the variable specification items is the maximum weight of the workpiece which can be carried by the robot. A numerical value range of the load capacity is defined for every base robot, and the requirement specification of the load capacity can be set from a given numerical value range. The price range among the variable specification items is a price range of the selling price of the robot. A plurality of price ranges are defined for every base robot, and the requirement specification of the price can be selected from the plurality of price ranges.

Simulation tools, such as an operation simulating program and a cost simulating program, are stored in the storage device M7. By the processing device 122 reading each simulating program from the storage device M7 and executing the program, the processing device 122 functions as a simulator.

The operation simulating program models the virtual object of the robot, and predicts behavior of the model. The predicted behavior of the virtual object of the robot may be displayed on the customer terminal 103. The cost simulating program calculates an anticipated cost based on the price, the shipping cost, etc. of the parts which constitute the virtual object of the robot. The calculated anticipated cost is displayed on the customer terminal 103.

In the storage device M8, the part conformity examination result database is established, which stores information on the combinations of the movable units which satisfy the special order specification (described later), and the combinations of the movable units and the end effector units. The information stored in the part conformity examination result database may be a database of work results of the conformity examination which the robot manufacturer's person in charge has conventionally performed. Moreover, the information stored in the part conformity examination result database may be simulation results of the conformity examination of parts performed under various conditions. Note that the result of a part conformity processing (described later) is sequentially added to the part conformity examination result database.

The storage device M9 stores, for example, various programs for performing various processings related to the trade of the robot, such as a base robot search program, a special order specification determination program, a conformity examination program, a robot presentation program, an ordering program, and an additional unit presentation program.

Unless particularly illustrated, the various processings of the trading system 101 of the robot is performed by the processing device 122 executing the various programs stored in the storage device M9. In other words, by the processing device 122 executing the given program, the processing device 122 functions as a processing part which performs processing in accordance with the program. Specifically, the processing device 122 executes these programs to function as each of the functional parts, such as a base robot search part 221, a special order specification determination part 222, a conformity examination part 223, the robot presentation part 224, an ordering part 225, and an additional unit presentation part 226. Note that the customer terminal 103 may substitute for a part of the functions of the processing device 122 by a part or all of the various programs being sent to the customer terminal 103 through the network 110, and being executed by the customer terminal 103.

Figure 15:
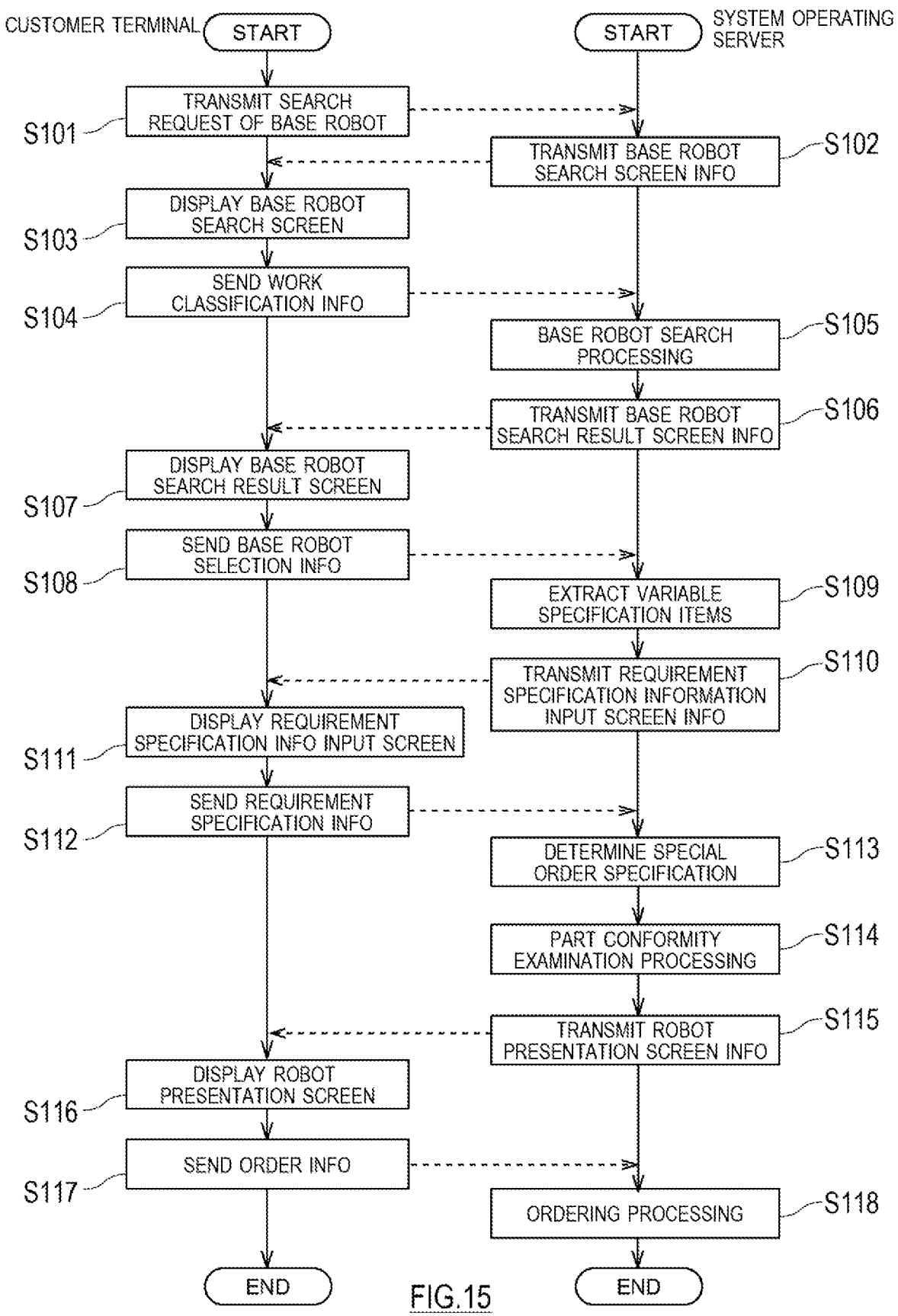
FIG. 15 is a sequence chart of a method of trading robot.

Next, a method of trading the robot according to this embodiment is described using a sequence chart of FIG. 15. Note that, unless otherwise particularly illustrated, the exchange of the information between the customer terminal 103, the system operating server 102, and the robot manufacturer terminal 104 is performed by communication of the data through the network 110.

First, the customer accesses the system operating server 102 using the customer terminal 103, and transmits a search request for the base robot which becomes the base of the robot which the customer wants to purchase (Step S101). In response to this search request, the system operating server 102 executes the base robot search program to transmit the base robot search screen 171 (see FIG. 16) to the customer terminal 103 (Step S102), and displays the base robot search screen 171 on the display device (monitor etc.) of the customer terminal 103 (Step S103).

Figure 16:
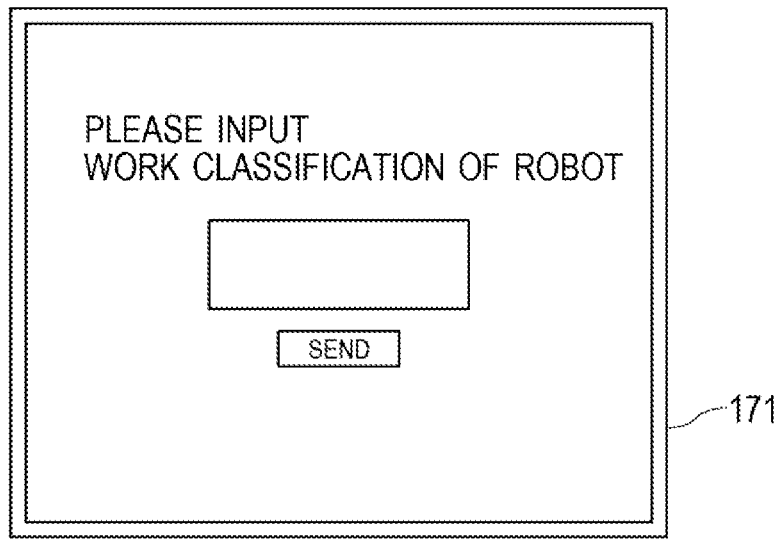
FIG. 16 is a view illustrating one example of a base robot search screen.

FIG. 16 is a view illustrating one example of the base robot search screen 171 displayed on the customer terminal 103. The customer inputs into the customer terminal 103 the work classification information on the work to be performed by the robot which the customer purchases, according to the guidance of the base robot search screen 171 displayed on the customer terminal 103. The customer terminal 103 sends the inputted work classification information to the system operating server 102 (Step S104). The system operating server 102 acquires the work classification information, and executes the base robot search program to perform the base robot search processing based on the acquired work classification information (Step S105). In the base robot search processing, the system operating server 102 searches the base robot which suits the work classification information from the base robot information stored in the base robot database, i.e., the base robot which is capable of performing the work according to the work classification information. The system operating server 102 searches for one or more base robots by this search, transmits the base robot search result screen information including the characteristic and the appearance of the base robot to the customer terminal 103 (Step S106), and displays the base robot search result screen 172 (see FIG. 17) on the customer terminal 103 (Step S107).

Note that, upon the search for the base robot, a question-answer system based on artificial intelligence technologies may be applied. That is, the system operating server 102 may repeat displaying a question on the customer terminal 103 and/or outputting voice of the question to the customer terminal 103 so as to ask the customer with natural language, and accepting the reply of natural language which the customer inputted into the customer terminal 103, to search for the base robot according to the request from the customer.

Figure 17:
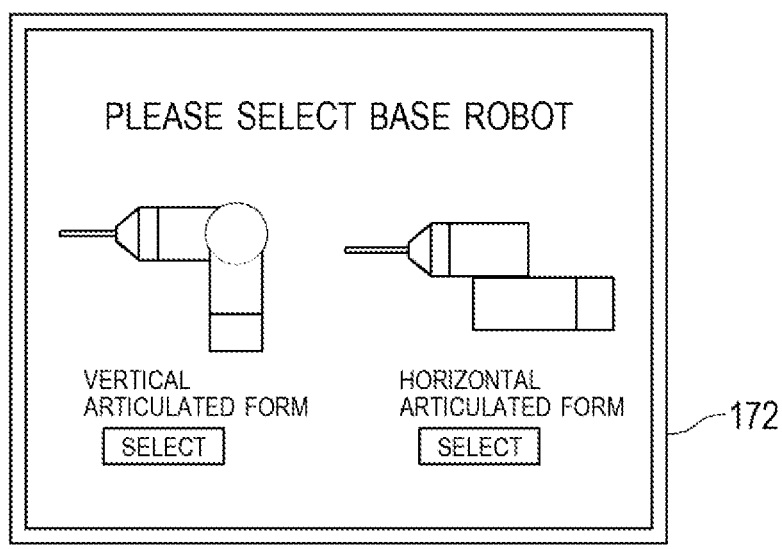
FIG. 17 is a view illustrating one example of a base robot search result screen.

FIG. 17 is a view illustrating one example of the base robot search result screen 172. One or more base robots are displayed in the base robot search result screen 172 as the information including the characteristic and the appearance of the base robot. In the example illustrated in FIG. 17, a vertical articulated base robot which is formed by serially coupling the control unit 181, the bending unit 183, and the end effector unit 184, and a horizontal articulated base robot which is formed by serially coupling the control unit 181, the bending unit 183, and the end effector unit 184, are illustrated. Further, an input part for the base robot selection information for inputting whether the searched base robots are to be adopted, which one of the searched base robots is to be adopted, is provided in the base robot search result screen. If the customer does not adopt the searched base robot(s), the screen returns to the base robot search screen 171, and the base robot search processing is again repeated.

If the customer adopts the searched base robot, the customer terminal 103 sends the base robot selection information inputted by the customer to the system operating server 102 (Step S108). Note that, Steps S101-S107 may be omitted, and instead of the system operating server 102 displaying the base robot search result screen 172 on the customer terminal 103, a plurality of types of base robots may be displayed on the customer terminal 103 to urge the customer an input of the selection information on the base robot.

The system operating server 102 which acquired the base robot selection information executes the special order specification determination program to perform the special order specification determination processing. In the special order specification determination processing, the system operating server 102 first extracts the variable specification items related to the base robot from the base robot selection information (or the work classification information and the base robot selection information) in the variable specification database (Step S109). Note that, among the variable specification items related to the base robot, items which is not relevant to the already-acquired work classification information may be excluded from the extraction.

The system operating server 102 transmits the requirement specification input screen information for indicating altogether or individually to the customer terminal 103 each extracted item of the variable specification, and an input demand of the requirement specification information including at least one specification among the variable specification items (Step S110), and displays the requirement specification input screen 173 (see FIG. 18) on the customer terminal 103 (Step S111).

Figures 18, 19:
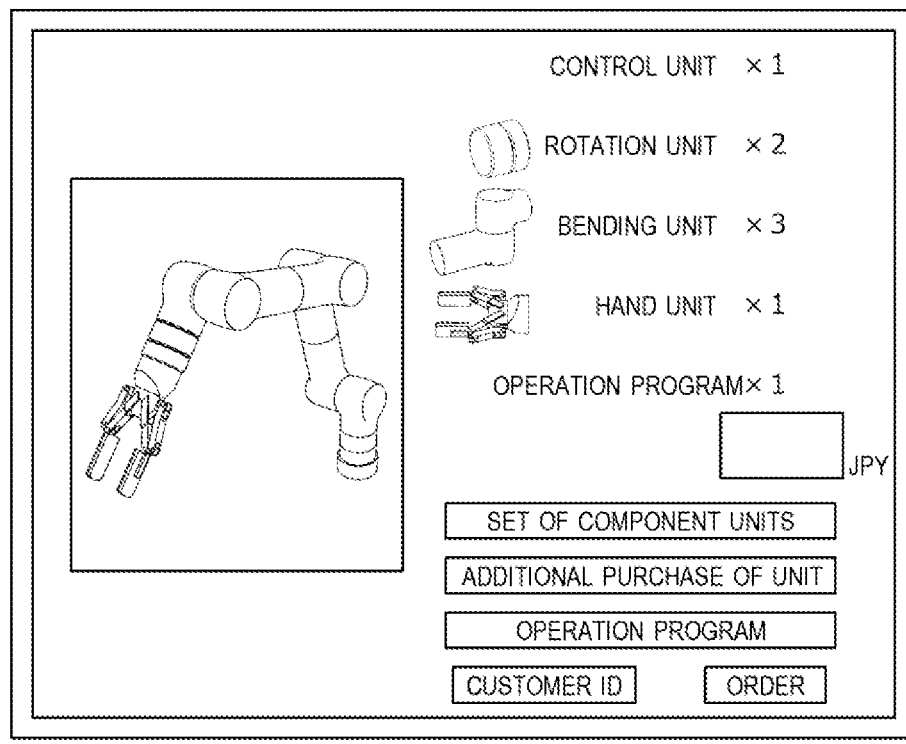
FIG. 18 is one example of a requirement specification input screen.
FIG. 19 is one example of a robot presentation screen.

FIG. 18 is one example of the requirement specification input screen 173 displayed on the customer terminal 103. The requirement specification input screen 173 is provided with the variable specification items of the selected base robot, and the requirement specification information input part of the variable specification items. The requirement specification information input part is, for example, sliders corresponding to the variable ranges of the variable specification items, and the customer moves the sliders in the screen to input the requirement specification information for each variable specification item.

Note that the presented variable specification item includes at least one of the number of axes and the operating range. When there are a plurality of types of rotation units 182 and bending units 183 having different motor outputs, the presented variable specification item may include at least one of the number of axes, the operating range, the operating posture, the operating vibration characteristic, the operating speed, the positioning accuracy, the path accuracy, the generating force, the load capacity, and the price. Note that the variable specification item is not directly derive a component unit of the robot, such as "the length of the link member, the motor output . . . ," but is such an item that the customer can intuitively understand the work (operation) to be performed by the robot, such as "the operating range, the load capacity . . . ."

The customer terminal 103 sends the inputted requirement specification information to the system operating server 102 (Step S112). The system operating server 102 which acquired the requirement specification information determines the special order specification of the robot which adopted the requirement specification information for the variable specification items for which the requirement specification information is inputted, and adopted given standard specifications for the remaining variable specification items (Step S113). That is, the special order specification of the robot uses the basic specification peculiar to the base robot as the base, where an art or all of the variable specification items of the basic specification are replaced by the requirement specification.

The system operating server 102 which determined the special order specification of the robot as described above executes the conformity examination program to perform the part conformity examination processing (Step S114). In the part conformity examination processing, the system operating server 102 refers to the part conformity examination result database and searches the units stored in the movable unit database for a combination of the component units of the robot including the component unit of the base robot and the end effector unit database so that the special order specification is realized. Note that the searched component units of the robot may completely be the same as the component units of the base robot.

The system operating server 102 searches for data corresponding to the special order specification while referring to the part conformity examination result database, and if there is corresponding data, it determines the combination of the component units of the robot based on the data. On the other hand, if there is no data corresponding to the special order specification as a result of the system operating server 102 referring to the part conformity examination result database, the system operating server 102 learns the data stored in the part conformity examination result database and analyzes the rule, applies this rule to the special order specification to predict data which satisfies the special order specification, and determines the combination of the component units of the robot.

For example, in the part conformity examination processing, the system operating server 102 searches for the combination of the component units including the type of the end effector unit 184, the number of rotation units 182, the number of bending units 183, and the serial configuration of the rotation unit 182 and the bending unit 183 so that requirement specification of the operating range is realized.

After the search for the component units of the robot is finished, the system operating server 102 executes the robot presentation program to perform the robot presentation processing. In the robot presentation processing, the system operating server 102 transmits the robot presentation screen information to the customer terminal 103 (Step S115), and displays the robot presentation screen 174 (see FIG. 19) on the customer terminal 103 (Step S116). Here, the system operating server 102 may utilize the simulation tool and display the virtual object of the robot where the searched parts are mounted to the base robot to the customer terminal 103.

FIG. 19 illustrates one example of the robot presentation screen 174. In the robot presentation screen 174, the virtual object of the robot of the special order specification which is customized based on the customer's requirement specification as described above is displayed. This virtual object may be displayed as a still image, or may be displayed as an animation which performs the work, or may be displayed so that the virtual object operates in the screen according to operation of the customer. Thus, the customer can visually observe the robot presentation screen 174 and operate the virtual object of the robot in the screen to freely try the robot customized by his/her own requirement specification.

In addition, a quotation of the robot is displayed on the robot presentation screen 174 (this may be displayed in a separate screen from the screen where the virtual object of the robot is displayed). Thus, the customer can know the price of the robot before purchasing the robot.

Further, the robot presentation screen 174 (this may be a separate screen from the screen where the virtual object and the quotation of the robot are displayed) is provided with the order input part for the displayed robot. The customer can determine a purchase of the robot, after trying the virtual object of the robot. When the customer purchases a robot, the customer inputs order information including the customer information into the order input part and clicks an order button, and the order information is then sent to the system operating server 102 from the customer terminal 103 (Step S117). The order information may include the information on the customer, such as the shipping address and the customer ID, and the payment information, such as the payment method, in addition to the set of component units of the robot presented in the robot presentation screen 174. The component unit of the robot is an assembly unit when the customer assembles the robot. Thus, the customer can purchase the set of component units of the robot (including the operation program and the dressing parts).

Here, if the customer has already possessed a robot of another type, he/she adds some parts to the possessed robot and reassembling the units to realize the robot he/she is going to purchase this time. At this time, the customer may also purchase a robot as unit by unit. In such a case, when the customer inputs the customer ID used for the last purchase of the robot into the customer ID input part provided in the robot presentation screen 174 and clicks an additional purchase button of the unit, the additional purchase information is sent to the system operating server 102 from the customer terminal 103.

Figure 20:
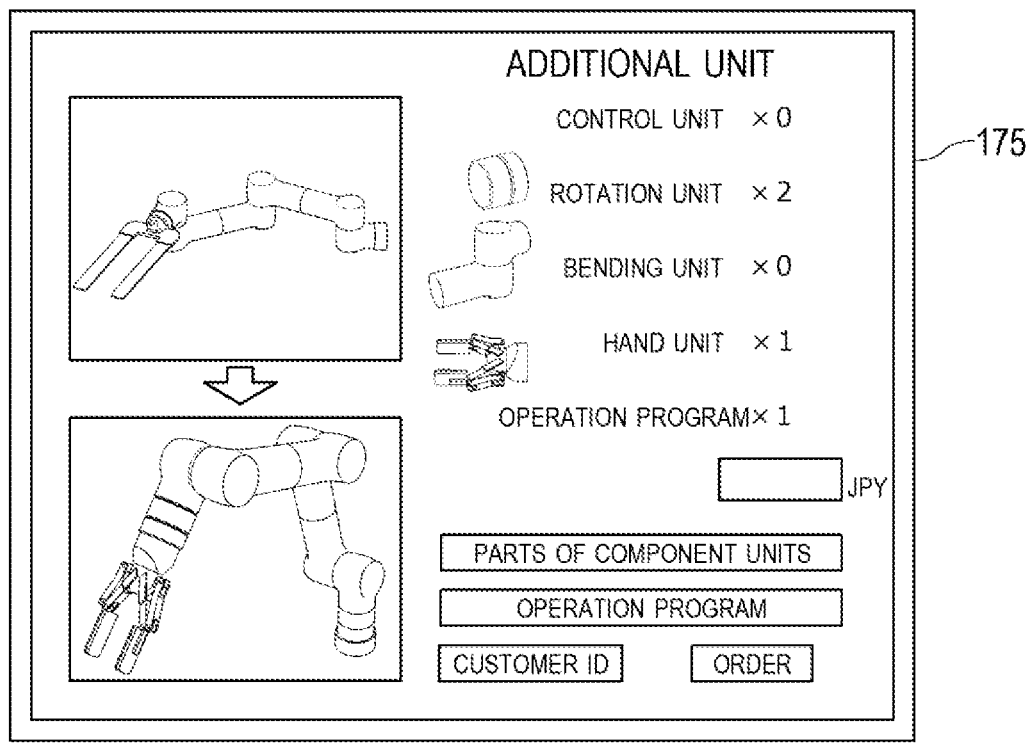
FIG. 20 is one example of an additional unit presentation screen.

The system operating server 102 which acquired the additional purchase information executes the additional unit presentation program to perform the additional unit presentation processing. In the additional unit presentation processing, information on the component units of the robot possessed by the customer is read from the customer information database based on the customer ID, the units to be added in order for the customer to realize the robot are extracted based on the information, and additional unit information which listed the units and parts to be added is sent to the customer terminal 103. For example, an additional unit presentation screen 175 as illustrated in FIG. 20 is displayed on the customer terminal 103 which acquired the additional unit information.

For example, if the customer possesses a robot 108' illustrated in FIG. 12, and purchases the robot 108 illustrated in FIG. 11 this time, the units to be added include two sets of rotation units 182, an end effector unit 184, and an operation program. When the customer purchases the unit to be added and clicks the order button provided in the additional unit presentation screen 175, the order information is sent to the system operating server 102 from the customer terminal 103. The order information may include the information on the customer, such as the shipping address and the customer ID, and the payment information, such as the payment method, in addition to the additional units presented in the additional unit presentation screen 175.

The system operating server 102 which received the order information stores the order information in the customer information database, and executes the ordering program to perform the ordering processing of the robot (Step S118). In the ordering processing, the system operating server 102 generates the delivery list information based on the order information. The delivery list information includes a list of the component units of the robot to be provided to the customer. The assembly unit of the robot is the unit, and the robot is provided to the customer in a state of the units of the control unit 181, the rotation unit 182, the bending unit 183, and the end effector unit 184.

The generated delivery list information is sent to the robot manufacturer terminal 104 from the system operating server 102. When the robot manufacturer terminal 104 receives the delivery list information, the robot manufacturer packs the component units in the delivery list, and sends the units to the shipping address specified by the customer.

The robot is provided from the robot manufacturer to the customer as an assembly kit in which a set of component units is packed as one unit, or as one or more additional units requested by the customer. The operation program of the robot may be handed to the customer as a recording medium which stores the program, or may be installed beforehand in the controller.

The customer who received the component units of the robot completes the robot by assembling the component units, while referring to the attached assembling drawing. Note that the units of the robot are designed so that the assembling operation of the robot can be performed using comparatively easy fastening methods, such as screw fastening, fitting, and adhesion. Thus, the robot is configured so that it can be assembled easily at the customer's end.

As described above, in the trading system 101 of the robot of this embodiment, the base robot is the serially coupled body comprised of the control unit 181, and the arm part having at least one movable unit 182, 183, and the end effector unit 184. The trading system 101 includes the variable specification database (storage device M6) where the information on the variable specification of the base robot including at least one variable specification item of the base robot is stored, the movable unit database (storage device M3) where the information on the movable unit 182, 183 is stored, the part conformity examination result database (storage device M8) where the information on the combination of the movable unit(s) 182, 183 of which the variable specification is changed is stored, the special order specification determination part 222 which reads the variable specification item corresponding to the base robot from the variable specification database, displays the variable specification item on the customer terminal 103, and receives from the customer terminal 103 the special order specification of which at least one variable specification item is changed, the conformity examination part 223 which searches for the combination of the movable unit 182, 183 which realizes the special order specification based on the information stored in the movable unit database and the part conformity examination result database, the robot presentation part 224 which displays the virtual object of the robot which is the serially coupled body of the control unit 181, the searched combination of movable unit 182, 183, and end effector unit 184 on the customer terminal 103, and the ordering part 225 which receives the order of a set or a part of component units of the robot from the customer terminal 103, and accepts the order.

Although in the above embodiment the conformity examination part 223 examines the combination of the movable unit 182, 183 and the end effector unit 184, the type of the end effector unit 184 may be determined beforehand, and the conformity examination part 223 may examine only the combination of the movable unit 182, 183. The combination of the movable unit 182, 183 include the information, such as the number of rotation units 182, the number of bending units 183, the order of coupling the units.

Moreover, in the method of trading the robot of this embodiment, the base robot is the serially coupled body comprised of the control unit 181, the arm part having at least one movable unit 182, 183, and the end effector unit 184. The methods includes presenting at least one variable specification item to the customer for the base robot, receiving the special order specification of which at least one variable specification item is changed, searching for the combination of the movable unit 182, 183 which realizes the special order specification, presenting to the customer the virtual object of the robot which is the serially coupled body of the searched control unit 181, arm part comprised of the combination of movable unit 182, 183, and the end effector unit 184, receiving the order of a set or a part of component units of the robot from the customer, and accepting the order.

According to the trading system 101 of the robot and the method of trading the robot described above, even if the customer does not have a technical knowledge of the robot, he/she can order the robot customized to meet his/her own demanded specification. Moreover, since the virtual object of the robot is presented to the customer before the order for the robot, the customer can freely try the robot before the order. Moreover, since the cost can be reduced corresponding to the non-intervention of any humans in the conformity examination, the designing, etc. of the robot, the robot manufacturer can offer the robot at low price, and the customer can acquire the customized robot at low price.

Moreover, the trading system 101 of the robot according to this embodiment further includes the base robot database (storage device M2) where the information on the base robot including the work classification which suits the base robot is stored, and the base robot search part 221 which receives from the customer terminal 103 the work classification information on the work classification to be performed by the robot, searches the base robot database for one or more base robots which suit the work classification based on the work classification information, and displays the searched base robot on the customer terminal.

Similarly, the method of searching the robot according to this embodiment includes receiving the work classification information on the work classification to be performed by the robot, searching an information group related to the base robot including the work classification which suits the base robot (the base robot information stored in the base robot database) for one or more base robots which suit the work classification, and presenting the searched base robot(s) to the customer.

Thus, since the base robot suitable for the work which is demanded by the customer to the robot is proposed to the customer, even if the customer does not have a technical knowledge of the robot, he/she can select the base robot suitable for his/her own demanded specification.

Moreover, the trading system 101 of the robot according to this embodiment further includes the additional unit presentation part 226 which compares the component units of the robot possessed by the customer with the components unit of the robot, extracts the units to be added to the component units of the robot possessed by the customer so that the robot is realized, and displays the information on the unit to be added on the customer terminal 103.

Similarly, the method of trading the robot according to this embodiment includes comparing the component units of the robot possessed by the customer with the component units of the robot, extracting the units to be added to the component units of the robot possessed by the customer so that the robot is realized, and presenting the information on the units to be added to the customer.

The robot to be dealt can be rearranged to a robot of another mode by replacing the component units or adding a further unit to the component units. Thus, the customer can utilize resources effectively by constituting the robot which is newly demanded by the customer, using the component units of the robot which have already possessed by the customer.

Although the suitable embodiments of the present disclosure are described above, what changed the details of the concrete structures and/or functions of the above embodiment may be encompassed by the present disclosure, without departing from the spirit of the present disclosure. For example, the above configuration may be changed as follows.

For example, the trading systems 1 and 101 of the robot according to the above embodiments are to perform an electronic commerce of the robot. However, the trading systems 1 and 101 of the robot may also be used as a sales promotion tool for the robot manufacturer, without limited to the electronic commerce. In such a case, a component (a program, data, etc.) of the trading systems 1 and 101 of the robot may be installed in one portable computer.

DESCRIPTION OF REFERENCE CHARACTERS

1: Trading System
2: System Operating Server
3: Customer Terminal
4: Robot Manufacturer Terminal
8: Robot
10: Network
21: Interface
22: Processor
24: Recording-Medium Reading Device
71: Base Robot Search Screen
72: Base Robot Search Result Screen
73: Requirement Specification Input Screen
74: Customized Robot Presentation Screen
81: Pedestal
82: Interface
83: Turn Table
84, 87, 89: Joint Member
86: First Link
88: Second Link
90: End Effector
91, 92: Joint Drive Unit
95: Box For Packing
201: Base Robot Database
202: Variable Specification Database
203: Simulation Tool Database
204: Part Database
205: Part Conformity Examination Result Database
206: Program Database
101: Trading System
102: System Operating Server 121: Interface
122: Processing Device
221: Base Robot Search Part
222: Special Order Specification Determination Part
223: Conformity Examination Part
224: Robot Presentation Part
225: Ordering Part
226: Additional Unit Presentation Part
103: Customer Terminal
104: Robot Manufacturer Terminal
108: Robot
181: Control Unit
182: Rotation Unit (Movable Unit)
183: Bending Unit (Movable Unit)
184: End Effector Unit
110: Network
171: Base Robot Search Screen
172: Base Robot Search Result Screen
173: Requirement Specification Input Screen
174: Robot Presentation Screen
175: Additional Unit Presentation Screen
M1-M9: Storage Device

What is claimed is:

1. A trading system of a base robot formed of components including (i) a serially coupled body of a control unit, (ii) an arm part formed by at least one movable unit, and (iii) an end effector unit, the system comprising:
at least one memory including:
a variable specification database configured to store information on variable specifications of the base robot, the information containing variable specification items of the base robot and initial values of the variable specification items, the variable specification items including a number of axes of the base robot and an operating range of the base robot;
a movable unit database configured to store information on the at least one movable unit, the at least one movable unit including a bending unit and a rotation unit, the bending unit including two links coupled to each other through a bending joint, the rotation unit including two members arranged on a centerline and coupled to each other such that the two members are rotatable about the centerline as a rotation center; and
a part conformity examination result database configured to store information on a combination of the at least one movable unit in which a corresponding variable specification is changed;
a customer terminal; and
a processor operatively coupled to the customer terminal and the at least one memory, the processor being programmed to:
read each of the variable specification items corresponding to the base robot from the variable specification database;
display each of the read variable specification items of the base robot on the customer terminal;
receive, from the customer terminal, a special order specification in which at least one of the variable specification items is changed from an initial value;
search for a combination of the at least one movable unit that satisfies the special order specification based on the information stored in the movable unit database and the part conformity examination result database, the combination containing a number of rotation units, a number of bending units, and a serial configuration of the rotation units and the bending units;
display on a graphical user interface of the customer terminal, an animation of a virtual object of the base robot that is the serially coupled body of the control unit, the searched combination of the at least one movable unit, and the end effector unit, the animation of the virtual object corresponding to the searched combination and an operation satisfying the special order specification, and the animation is an animation of the base robot performing a work process using a configuration of the base robot constructed pursuant to the special order specification;
receive, via the graphical user interface of the customer terminal, inputs to the graphical user interface to control movement of the virtual object as the animation; and
receive an order of a set or a part of the components of the base robot from the customer terminal according to the serially coupled body of the control unit, the searched combination of the at least one movable unit, and the end effector unit, and accept the order.

2. The trading system of claim 1, wherein:
the at least one memory includes a base robot database configured to store information on the base robot including a work classification that suits the base robot; and
the processor is programmed to:
receive, from the customer terminal, work classification information on the work classification to be performed by the base robot,
search the base robot database for one or more base robots that suit the work classification based on the work classification information, and
display a searched base robot on the customer terminal.

3. The trading system of claim 1, wherein:
the at least one memory stores a customer information database storing customer information, the customer information containing identification information of a customer and information on components of another base robot possessed by the customer; and
the processor is programmed to:
compare components of the other base robot possessed by the customer of the customer terminal with the components of the base robot,
extract one of the components that forms the base robot to be added to the components possessed by the customer in order to completely form the other base robot of the customer, and
display information on the extracted component on the customer terminal.

4. The trading system of claim 1, wherein the variable specification items further include at least one of an operating vibration characteristic, an operating speed, a positioning accuracy, a path accuracy, a generating force, a load capacity, or a price range.

5. A method of trading a base robot formed of components including (i) a serially coupled body of a control unit, (ii) an arm part formed by at least one movable unit, and (iii) an end effector unit, the method comprising:
reading each variable specification item of a plurality of variable specification items corresponding to the base robot from a variable specification database stored in at least one memory, the variable specification database storing information containing the variable specification items of the base robot and initial values of the variable specification items, the variable specification items including a number of axes of the base robot and an operating range of the base robot;

displaying each respective variable specification item of the plurality of variable specification items of the base robot to a customer on a display of a customer terminal;

receiving, from the customer terminal, a special order specification in which at least one of the variable specification items is changed from an initial value, which is stored in the variable specification database;

searching for a combination of the at least one movable unit that satisfies the special order specification based on information stored in a movable unit database and a part conformity examination result database, the combination containing a number of rotation units, a number of bending units, and a serial configuration of the rotation units and the bending units, the movable unit database storing information on the at least one movable unit, the at least one movable unit including a bending unit and a rotation unit, the bending unit including two links coupled to each other through a bending joint, the rotation unit including two members arranged on a centerline and coupled to each other such that the two members are rotatable about the centerline as a rotation center;

displaying, on a graphical user interface of the display of the customer terminal, an animation of a virtual object of the base robot that is the serially coupled body of the control unit, the searched combination of the at least one movable unit, and the end effector unit, the animation of the virtual object corresponding to the searched combination and an operation satisfying the special order specification, and the animation is an animation of the base robot performing a work process using a configuration of the base robot constructed pursuant to the special order specification;

receiving, via the graphical user interface of the customer terminal, inputs to the graphical user interface to control movement of the virtual object as the animation; and receiving a set or a part of an order of components of the base robot from the customer terminal according to the serially coupled body of the control unit, the searched combination of the at least one movable, unit, and the end effector unit, and accepting the order.

6. The method of claim 5, further comprising:
receiving work classification information on a work classification to be performed by the base robot;
searching an information group related to the base robot including the work classification that satisfies the base robot for one or more base robots that satisfy the work classification; and
displaying a searched base robot to the customer on the display of the customer terminal.

7. The method of claim 5, further comprising:
comparing components of another base robot possessed by the customer with the components of the base robot,
extracting one of the components that forms the base robot to be added to the components possessed by the customer in order to completely form the other base robot of the customer, and
displaying information on the extracted component on the display of the customer terminal.

8. The method of claim 5, wherein the plurality of variable specification items further include at least one of an operating vibration characteristic, an operating speed, a positioning accuracy, a path accuracy, a generating force, a load capacity, or a price range.

* * * * *